(12) United States Patent
Uchibori

(10) Patent No.: US 10,781,743 B2
(45) Date of Patent: Sep. 22, 2020

(54) ENGINE DEVICE

(71) Applicant: Yanmar Co., Ltd., Osaka-shi, Osaka-fu (JP)

(72) Inventor: Masataka Uchibori, Osaka (JP)

(73) Assignee: YANMAR POWER TECHNOLOGY CO., LTD., Osaka (JP)

(*) Notice: Subject to any disclaimer, the term of this patent is extended or adjusted under 35 U.S.C. 154(b) by 0 days.

(21) Appl. No.: 16/091,855

(22) PCT Filed: Mar. 29, 2017

(86) PCT No.: PCT/JP2017/012963
§ 371 (c)(1),
(2) Date: Oct. 5, 2018

(87) PCT Pub. No.: WO2017/175641
PCT Pub. Date: Oct. 12, 2017

(65) Prior Publication Data
US 2019/0085757 A1     Mar. 21, 2019

(30) Foreign Application Priority Data
Apr. 8, 2016 (JP) ................... 2016-078467

(51) Int. Cl.
*F02B 37/013* (2006.01)
*F02B 37/18* (2006.01)
(Continued)

(52) U.S. Cl.
CPC .......... *F02B 37/013* (2013.01); *F01M 13/00* (2013.01); *F02B 37/00* (2013.01); *F02B 37/02* (2013.01);
(Continued)

(58) Field of Classification Search
CPC ....... F01M 13/00; F02B 37/00; F02B 37/013; F02B 37/02; F02B 37/18; F02M 35/10157; Y02T 10/144
See application file for complete search history.

(56) References Cited

U.S. PATENT DOCUMENTS 3,576,102 A * 4/1971 West .................. F02B 37/013
                                                        60/602
6,695,354 B2 * 2/2004 Brockmann ............ F16L 33/02
                                                         285/23
(Continued)

FOREIGN PATENT DOCUMENTS

DE    102015200155 A1    7/2015
EP        2050940 A1    4/2009
(Continued)

OTHER PUBLICATIONS

International Search Report dated Jun. 20, 2017 issued in corresponding PCT Application PCT/JP2017/012963.
(Continued)

*Primary Examiner* — Jesse S Bogue
(74) *Attorney, Agent, or Firm* — Norton Rose Fulbright US LLP

(57) ABSTRACT

An engine device including: an exhaust manifold disposed on one of left and right sides of a cylinder head, and an intake manifold disposed on another one of the left and right sides of the cylinder head. The engine device further includes a turbocharger that uses fluid energy of an exhaust gas discharged from the exhaust manifold to compress fresh air to be flowed into the intake manifold. The turbocharger is constituted by a two-stage turbocharger including a high-pressure turbocharger coupled to the exhaust manifold and a low-pressure turbocharger coupled to the high-pressure turbocharger. The high-pressure turbocharger is disposed on
(Continued)

one of left and right lateral sides of the exhaust manifold, while the low-pressure turbocharger is disposed above the exhaust manifold.

20 Claims, 29 Drawing Sheets

(51) Int. Cl.
  *F01M 13/00*  (2006.01)
  *F02B 37/00*  (2006.01)
  *F02B 37/02*  (2006.01)
  *F02M 35/10*  (2006.01)

(52) U.S. Cl.
  CPC ....... *F02B 37/18* (2013.01); *F02M 35/10157* (2013.01); *Y02T 10/144* (2013.01)

(56) References Cited

U.S. PATENT DOCUMENTS

| | | | | |
|---|---|---|---|---|
| 7,360,362 | B2* | 4/2008 | Nicolle | F01N 13/10 60/612 |
| 7,775,043 | B2* | 8/2010 | Funke | F02D 23/00 60/602 |
| 8,028,525 | B2* | 10/2011 | An | F02B 37/013 60/612 |
| 8,387,243 | B2* | 3/2013 | An | F01D 9/026 29/888.01 |
| 9,316,183 | B2* | 4/2016 | Rollins | F02M 25/0836 |
| 10,364,741 | B2* | 7/2019 | Higo | F02B 75/22 |
| 2012/0000196 | A1* | 1/2012 | Niwa | F02B 37/013 60/602 |
| 2013/0269341 | A1* | 10/2013 | Kurata | F02B 37/004 60/605.2 |
| 2014/0373821 | A1 | 12/2014 | Kitagawa | |

FOREIGN PATENT DOCUMENTS

| | | |
|---|---|---|
| GB | 1299784 A | 12/1972 |
| JP | 9-100725 A | 4/1997 |
| JP | 2595660 Y2 | 5/1999 |
| JP | 2005-133651 A | 5/2005 |
| JP | 2008-038869 A | 2/2008 |
| JP | 2008-038870 A | 2/2008 |
| JP | 2008-121635 A | 5/2008 |
| JP | 4517550 B | 8/2010 |
| JP | 2010-281282 A | 12/2010 |
| JP | 2012-012990 A | 1/2012 |
| JP | 2012-140890 A | 7/2012 |
| JP | 2013-133796 A | 7/2013 |
| JP | 5237785 B2 | 7/2013 |
| JP | 2015-045295 A | 3/2015 |
| JP | 2015-129488 A | 7/2015 |

OTHER PUBLICATIONS

Supplementary European Search Report dated Feb. 9, 2019 issued in corresponding EPC Application No. 17779020.1.
JP Office Action dated Sep. 11, 2019 issued in corresponding JP Application No. 2016-078467.

* cited by examiner

ENGINE DEVICE

CROSS REFERENCES TO RELATED APPLICATIONS

This application is a national stage application pursuant to 35 U.S.C. § 371 of International Application No. PCT/JP2017/012963, filed on Mar. 29, 2017 which claims priority under 35 U.S.C. § 119 to Japanese Patent Application No. 2016-078467 filed on Apr. 8, 2016, the disclosures of which are hereby incorporated by reference in their entireties.

TECHNICAL FIELD

The present invention relates to an engine device including a turbocharger.

BACKGROUND ART

Conventinally, an engine device is equipped with a turbocharger that uses exhaust energy to compress fresh air, in order to increase an air density in an engine cylinder, for the purpose of enhancing an engine output and improving a fuel efficiency (see Patent Literature 1 (PTL 1)). In a diesel engine, a large amount of high-density air is supplied into a cylinder to combust a large amount of fuel, which can increase an engine output and an engine torque can be increased, and also can facilitate mixing of the fuel and air to thereby reduce the amount of NOx discharge with suppression of premix combustion.

Since a single-stage turbocharger including a single turbocharger has a limitation against requirement of a high-output engine, an engine equipped with a two-stage turbocharger in which two turbochargers of a high-pressure stage and a low-pressure stage are coupled in series has been proposed (see Patent Literature 2 (PTL 2)).

CITATION LIST

Patent Literature

PTL 1: Japanese Patent No. 4517550
PTL 2: Japanese Patent No. 5237785

SUMMARY OF INVENTION

Technical Problem

An installation space for a diesel engine varies depending on a work vehicle (such as a construction machine or an agricultural machine) to which the diesel engine is installed. Recently, due to demand for weight reduction and compactification, the installation space is often restricted (confined). It therefore is necessary that component parts of the diesel engine are arranged in a compact layout. In addition to such a problem of the restricted installation space, a structure with a high rigidity is required of a cylinder head because component parts such as an EGR device and a turbocharger are coupled to and supported by the cylinder head.

Arranging a high-pressure stage turbocharger and a low-pressure stage turbocharger of a two-stage turbocharger one above the other at a position distant from an exhaust manifold as in an engine device of PTL 2 results in a high moment exerted on an outlet of the exhaust manifold which supports the two-stage turbocharger. Consequently, the two-stage turbocharger is supported with a lowered rigidity. In addition, a bypass path provided on a turbine side of the high-pressure stage is external piping, and therefore a piping structure of the two-stage turbocharger is complicated, which makes assemblage to the engine device troublesome.

A technical problem of the present invention is to provide an engine device that is improved based on studies on the existing circumstances as mentioned above.

Solution to Problem

An aspect of the present invention is an engine device including: an exhaust manifold and an intake manifold, the exhaust manifold being disposed on one of left and right sides of a cylinder head, the intake manifold being disposed on the other of the left and right sides of the cylinder head; and a turbocharger that uses fluid energy of an exhaust gas discharged from the exhaust manifold, to compress fresh air to be flowed into the intake manifold, the turbocharger being constituted by a two-stage turbocharger including a high-pressure turbocharger coupled to the exhaust manifold and a low-pressure turbocharger coupled to the high-pressure turbocharger, the high-pressure turbocharger being disposed on one of left and right lateral sides of the exhaust manifold, the low-pressure turbocharger being disposed above the exhaust manifold.

The engine device may be configured such that: the high-pressure turbocharger includes a high-pressure turbine and a high-pressure compressor, the high-pressure turbine being in communication with an exhaust gas outlet of the exhaust manifold, the high-pressure compressor being configured to supply compressed air to the intake manifold; the low-pressure turbocharger includes a low-pressure turbine and a low-pressure compressor, the low-pressure turbine having an exhaust gas inlet that is in communication with an exhaust gas outlet of the high-pressure turbine through an exhaust relay pipe, the low-pressure compressor having a fresh air outlet that is in communication with a fresh air inlet of the high-pressure compressor through a fresh air relay pipe; and the low-pressure compressor is disposed above the high-pressure turbine, the high-pressure compressor is disposed on one of front and rear sides relative to the high-pressure turbine, and the low-pressure turbine is disposed on the other of the front and rear sides relative to the low-pressure compressor.

The engine device may be configured such that: the exhaust manifold has an exhaust gas outlet that discharges an exhaust gas, the exhaust gas outlet being opened toward one of left and right lateral sides; the high-pressure turbine has an exhaust gas inlet that is opened toward the exhaust manifold, and has an exhaust gas outlet that is opened toward the other of front and rear sides; the low-pressure turbine has an exhaust gas inlet that is opened downward, and has an exhaust gas outlet that is opened toward the other of front and rear sides; the exhaust gas outlet of the exhaust manifold and the exhaust gas inlet of the high-pressure turbine that are opposed to each other are coupled, to fix the high-pressure turbocharger on one of left and right lateral sides of the exhaust manifold; and the exhaust gas outlet of the high-pressure turbine is fixed to one end of the exhaust relay pipe having an L-shape, the exhaust gas inlet of the low-pressure turbine is fixed to the other end of the exhaust relay pipe, and the low-pressure turbocharger is fixed above the high-pressure turbocharger.

The engine device may be configured such that: the high-pressure compressor has a fresh air inlet that is opened toward one of front and rear sides, and has a fresh air outlet that is opened downward; the low-pressure compressor has a fresh air inlet that is opened toward one of front and rear sides, and has a fresh air outlet that protrudes from one of left and right lateral sides and then is directed toward one of front and rear sides; and one end of the fresh air relay pipe having a U-shape is fixed to the fresh air inlet of the high-pressure compressor, and the other end of the fresh air relay pipe is coupled to the fresh air outlet of the low-pressure compressor.

The engine device may be configured such that: a blow-by gas recirculation device that takes a blow-by gas in is provided on the cylinder head, and a blow-by gas outlet disposed on one of front and rear sides of the blow-by gas recirculation device is coupled to an air supply pipe through a recirculation hose, the air supply pipe being coupled to the fresh air inlet of the low-pressure compressor; and the air supply pipe is disposed between the fresh air relay pipe and the cylinder head.

The engine device may be configured such that: the exhaust gas outlet of the high-pressure turbine is provided with a turbine discharge hole, a bypass hole, and a wastegate valve, the turbine discharge hole being configured to discharge an exhaust gas for rotating a turbine wheel, the bypass hole allowing the exhaust gas inlet and the exhaust gas outlet to communicate with each other, the wastegate valve being configured to open and close the bypass hole.

Advantageous Effects of Invention

In an aspect of the present invention, the high-pressure turbocharger with a low capacity is disposed opposed to the exhaust manifold, while the low-pressure turbocharger with a high capacity is disposed above the exhaust manifold 4. This enables the exhaust manifold and the two-stage turbocharger to be compactly arranged in a space existing on a left lateral side of the engine, and also enables a topmost portion of the two-stage turbocharger to be positioned lower than a topmost portion of the engine device. This can contribute to downsizing of the engine device. In addition, the low-pressure turbocharger can be disposed close to the cylinder head to which the exhaust manifold is coupled, and thus the two-stage turbocharger can be fixed with a high rigidity.

In an aspect of the present invention, the high-pressure turbine is coupled to the exhaust manifold, and the high-pressure turbocharger is supported with a high rigidity. In this condition, the low-pressure turbine is coupled to an upper surface of the exhaust relay pipe which is coupled to the high-pressure turbocharger. Thereby, the low-pressure turbocharger can be supported from below by the high-pressure turbocharger. Since the low-pressure turbocharger is installed close to a position above the exhaust manifold, the center of gravity of the low-pressure turbocharger is in the vicinity of a position above the position where the exhaust manifold is coupled to the high-pressure turbocharger. Accordingly, the two-stage turbocharger can be compactly supported with a high rigidity in the vicinity of the engine device.

In an aspect of the present invention, the high-pressure compressor and the low-pressure compressor are coupled by the U-shaped fresh air relay pipe, and a front portion of the low-pressure turbocharger can be fixed to the high-pressure turbocharger which is supported with a high rigidity by the exhaust manifold. The fresh air inlet and the fresh air outlet of the low-pressure compressor are extended in the same direction, and can be easily coupled to the air supply pipe which is in communication with an air cleaner (not shown) and to the fresh air relay pipe, respectively. This configuration can enhance a workability in assembling.

In an aspect of the present invention, the air supply pipe is coupled to the low-pressure turbocharger which is an upper component of the two-stage turbocharger, and is disposed close to the cylinder head. Thus, the distance between the air supply pipe and the blow-by gas recirculation device disposed above the cylinder head can be shortened. This makes it possible to shorten the recirculation hose. Since the air supply pipe is disposed in a space surrounded by the fresh air relay pipe and the cylinder head, the air supply pipe can be prevented from being damaged by an external force which may be applied in a coupling portion coupled to a resin pipe which is connected to the air cleaner (not shown).

In an aspect of the present invention, the exhaust gas outlet of the high-pressure turbine is provided with the turbine discharge hole and the bypass hole that are arranged side-by-side. With this configuration, it is possible to set whether to perform a compression operation by the high-pressure turbocharger in accordance with a rotational frequency of the engine device. Accordingly, with efficient use of exhaust energy, the two-stage turbocharger can stabilize the amount of fresh air to be supplied to the combustion chamber, and can reduce the amount of brack smoke discharge while increasing an engine output.

DESCRIPTION OF EMBODIMENT

Figure 1:
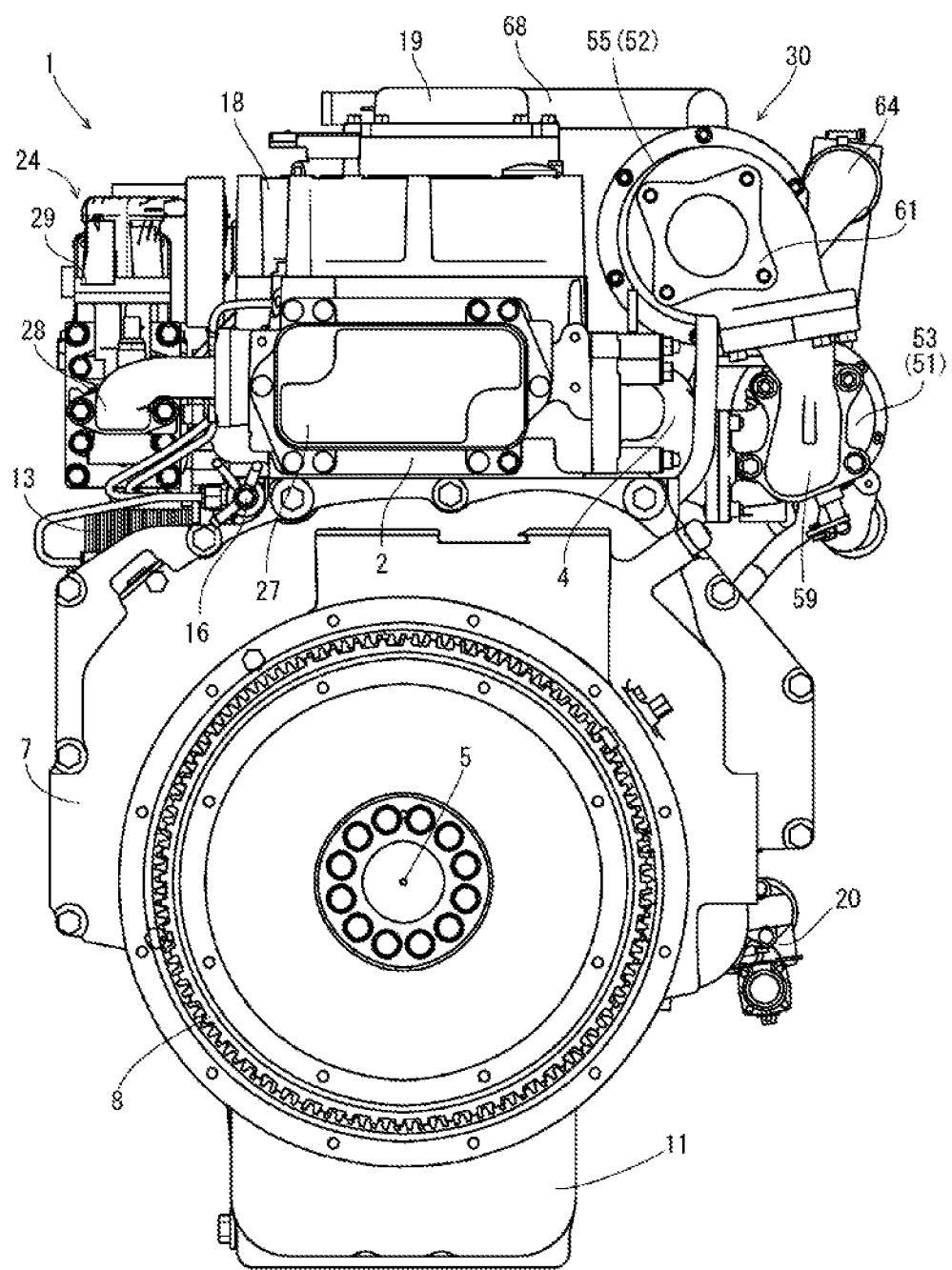
[FIG. 1] A front view of an engine.
Figure 2:
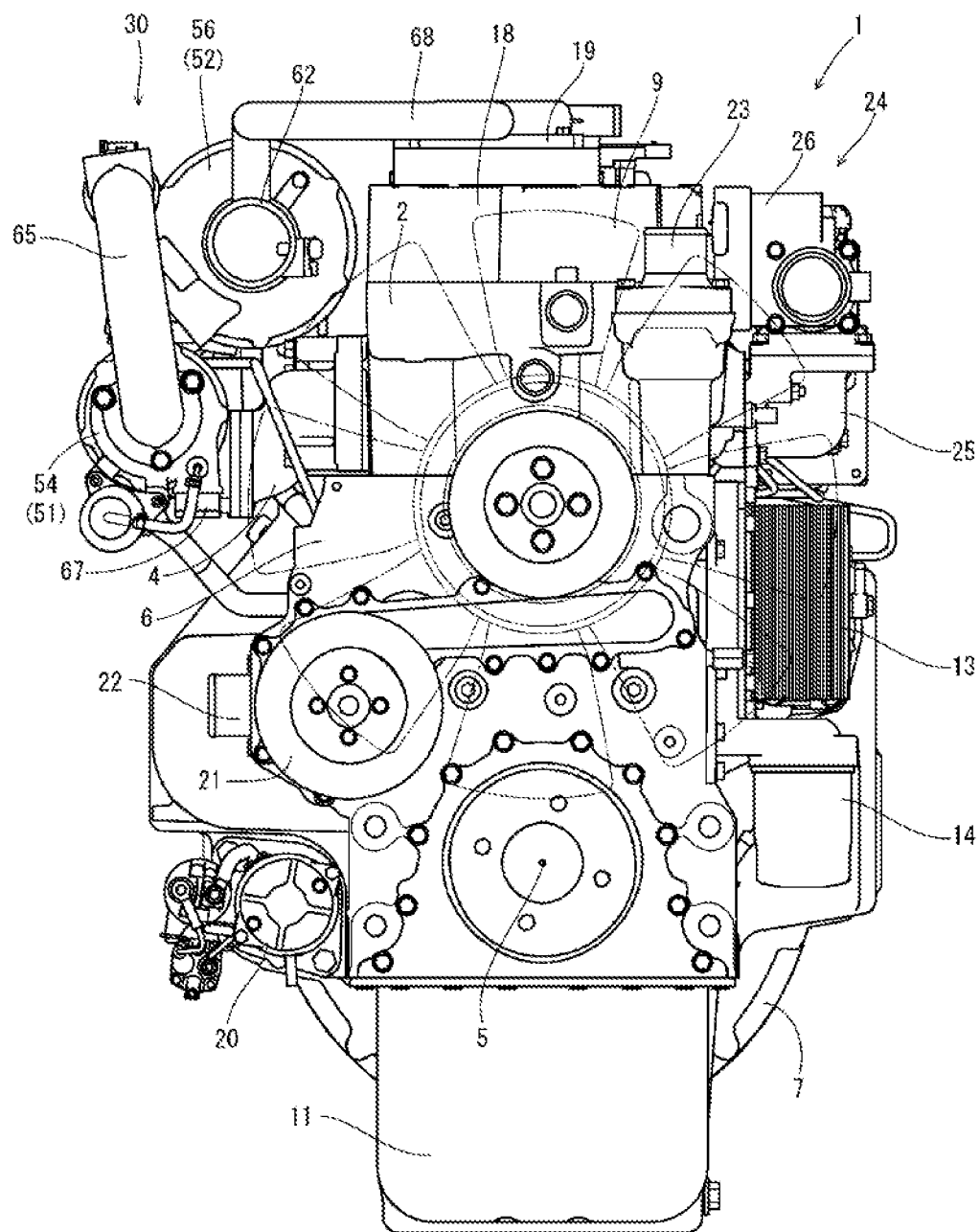
[FIG. 2] A rear view of the engine.
Figure 3:
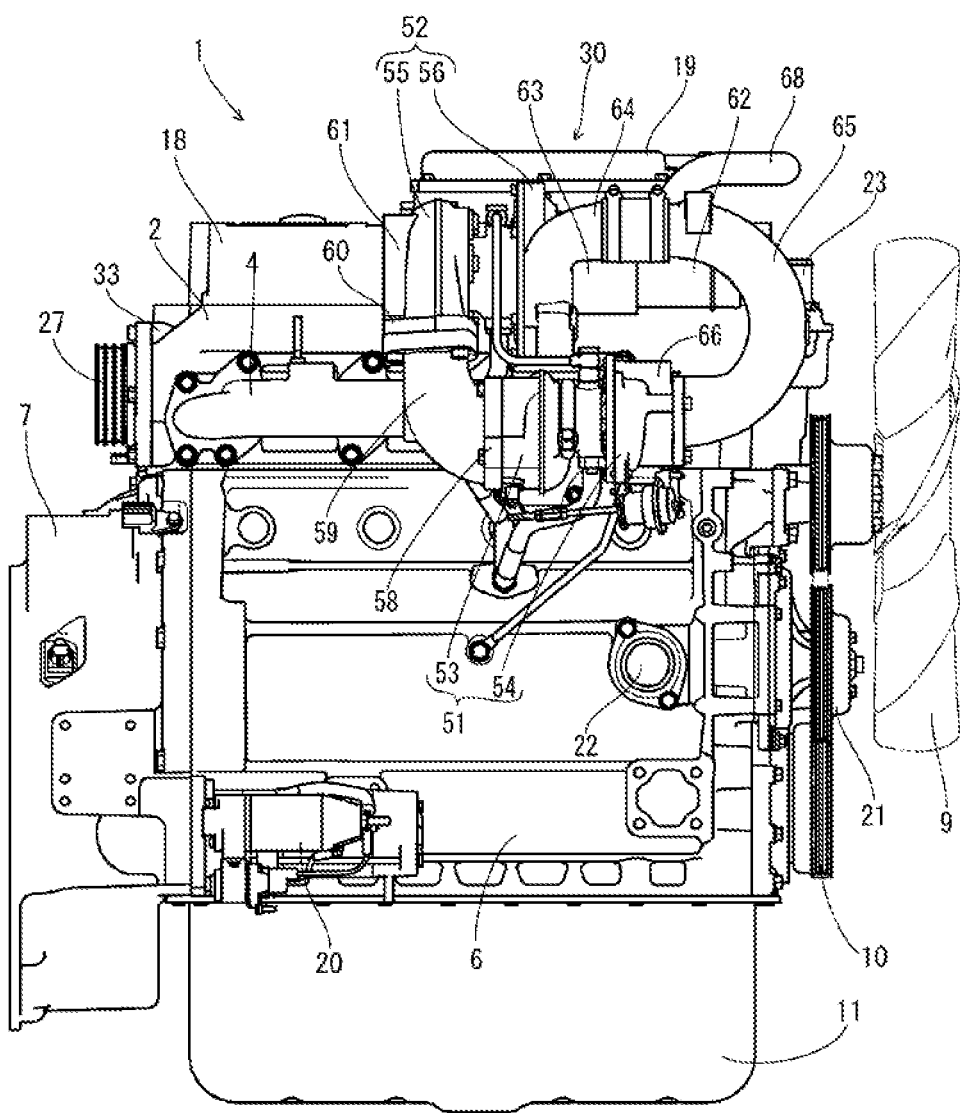
[FIG. 3] A left side view of the engine.
Figure 4:
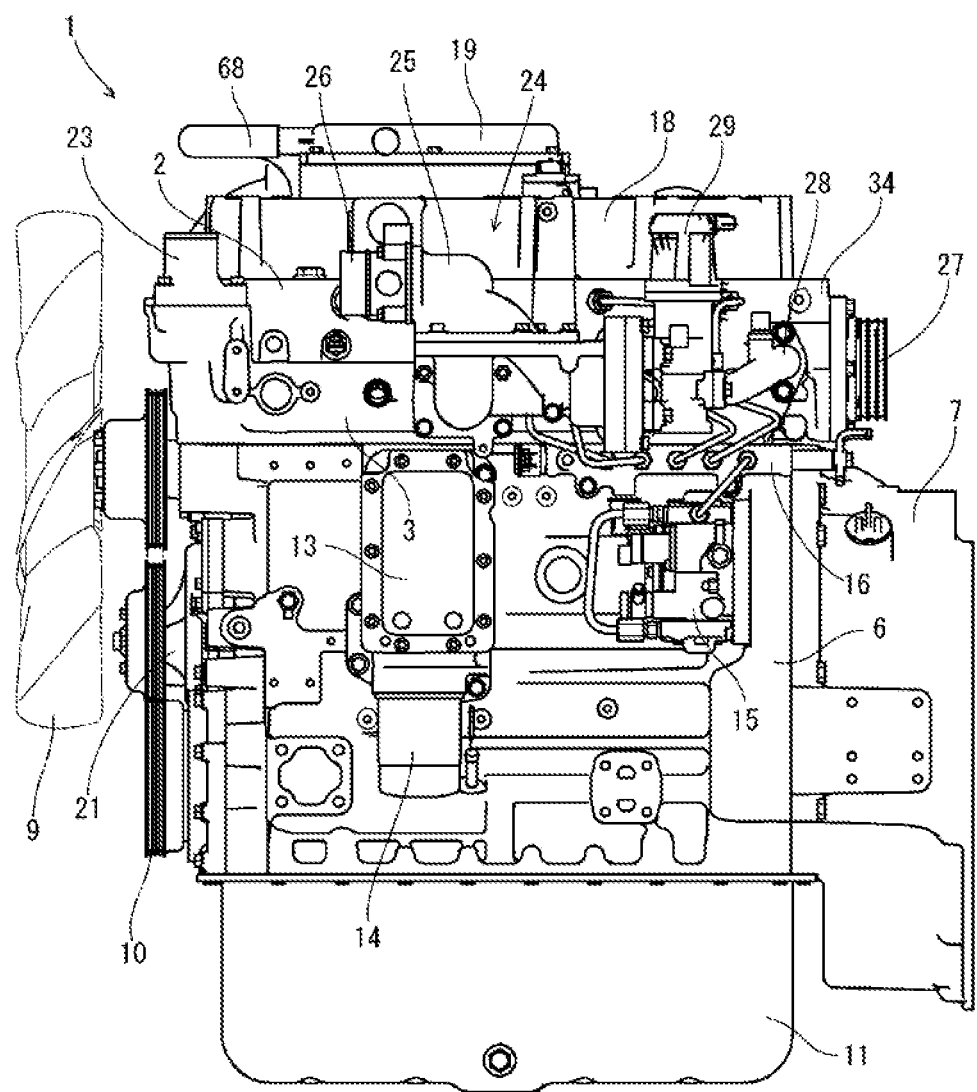
[FIG. 4] A right side view of the engine.
Figure 5:
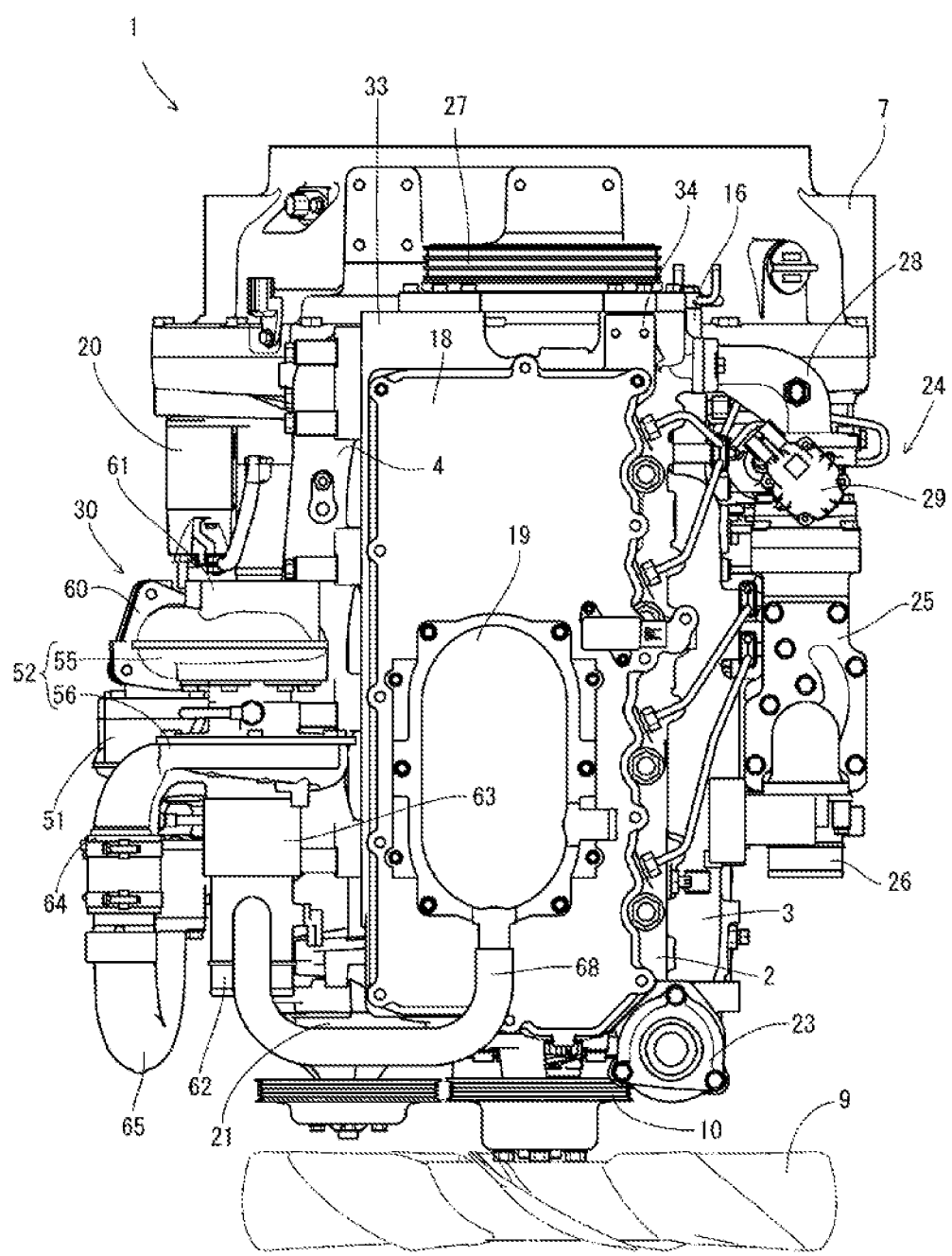
[FIG. 5] A top plan view of the engine.
Figure 6:
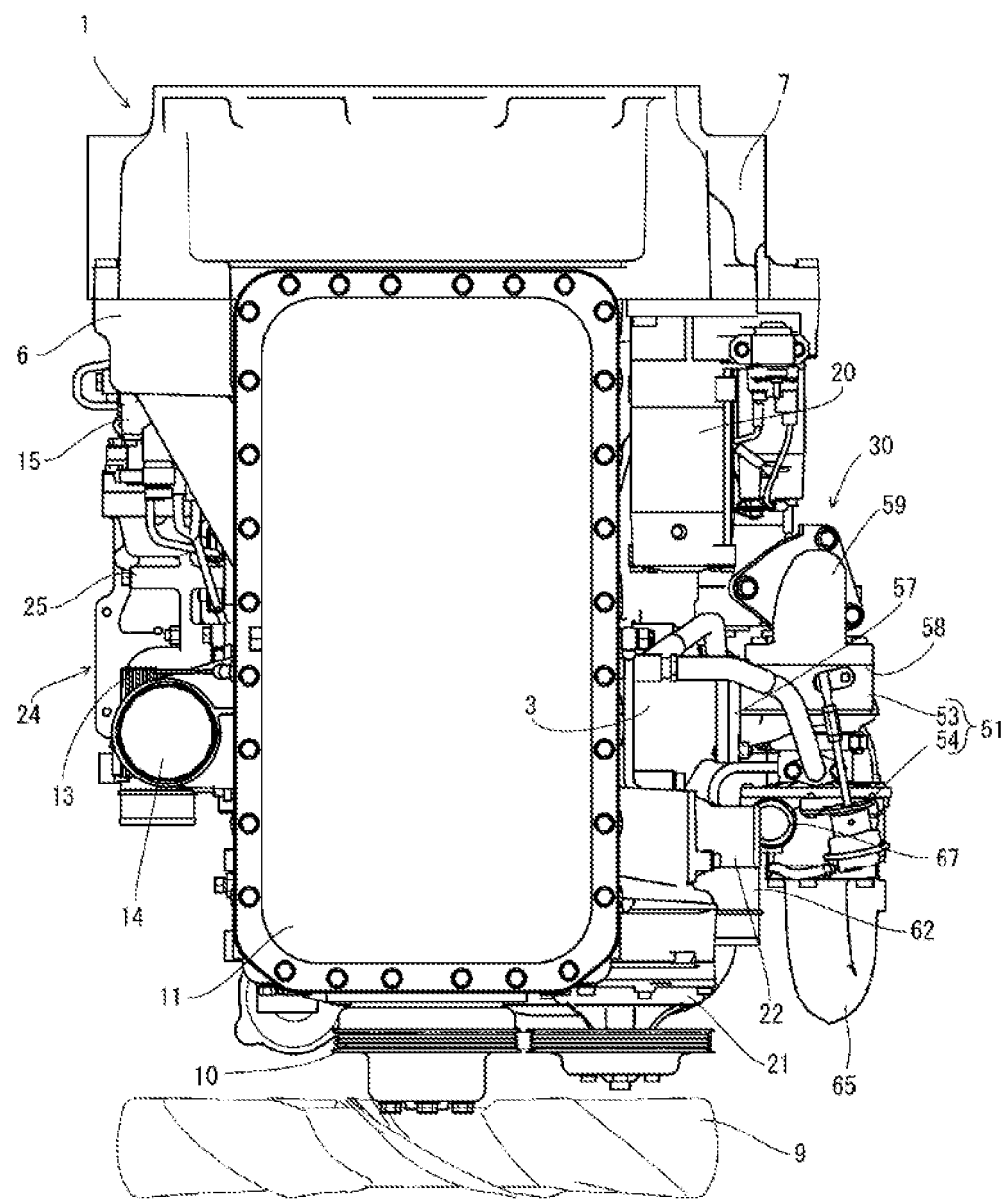
[FIG. 6] A bottom plan view of the engine.
Figure 7:
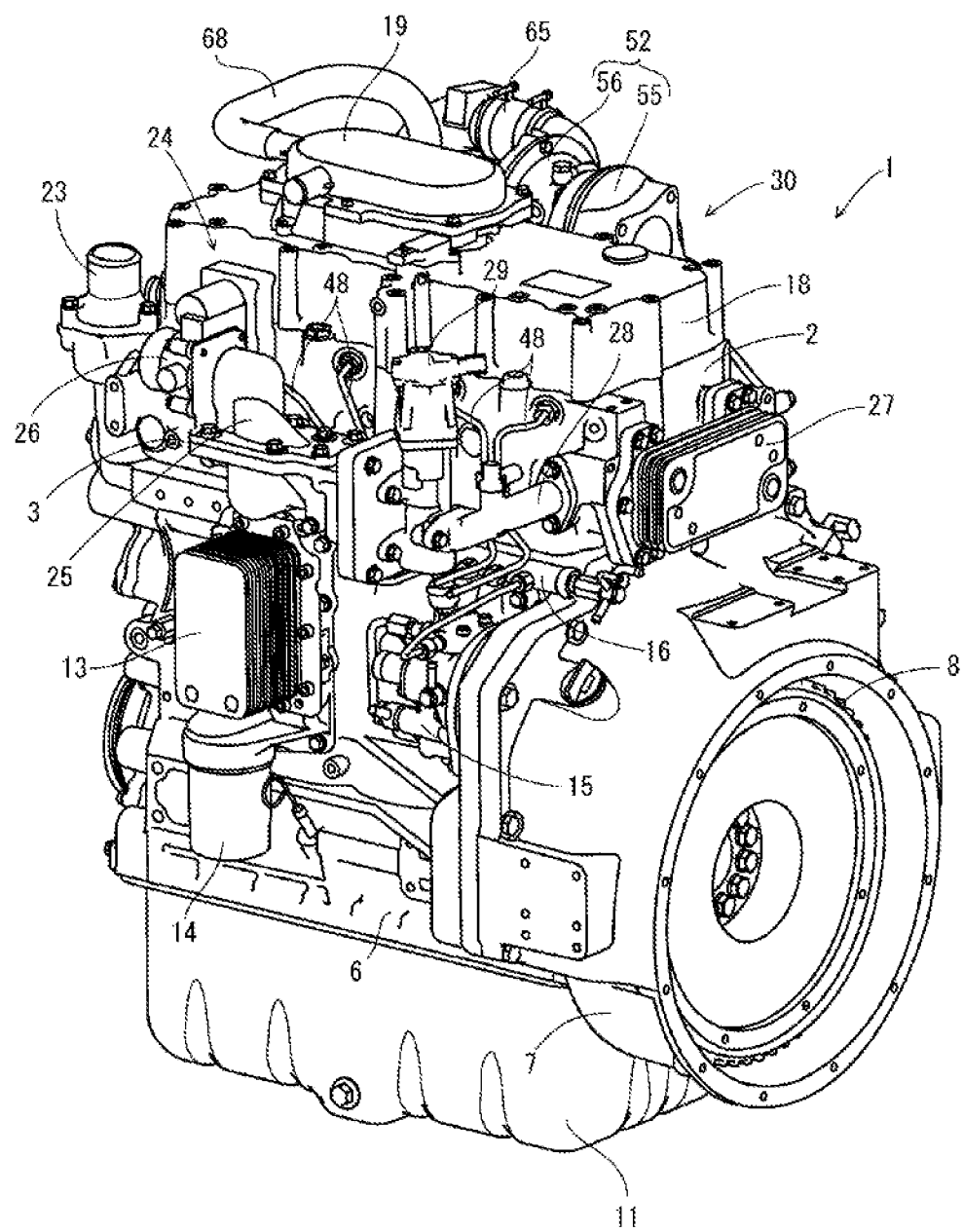
[FIG. 7] A perspective view of the engine as viewed from diagonally front.
Figure 8:
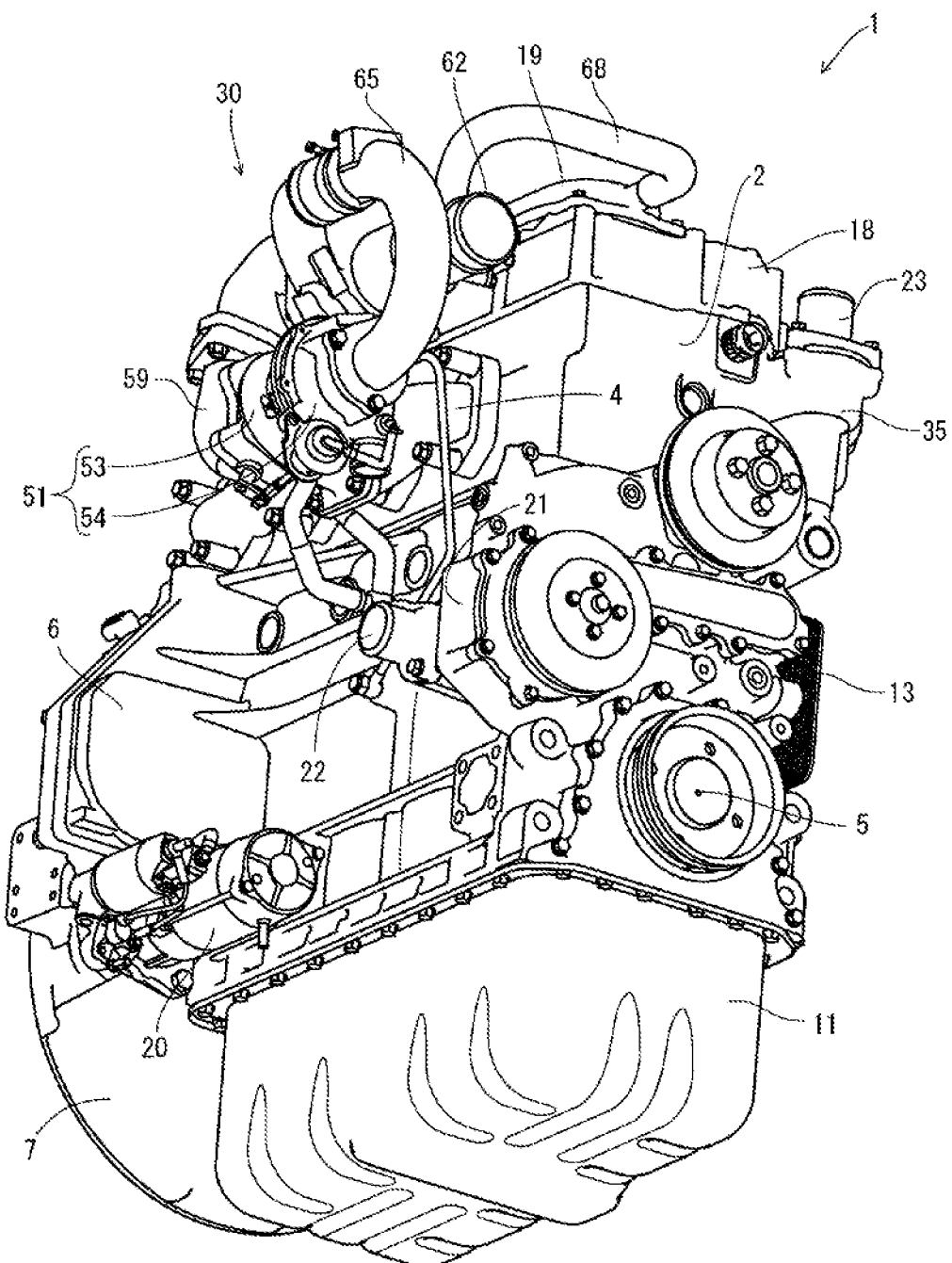
[FIG. 8] A perspective view of the engine as viewed from diagonally rear.
Figure 9:
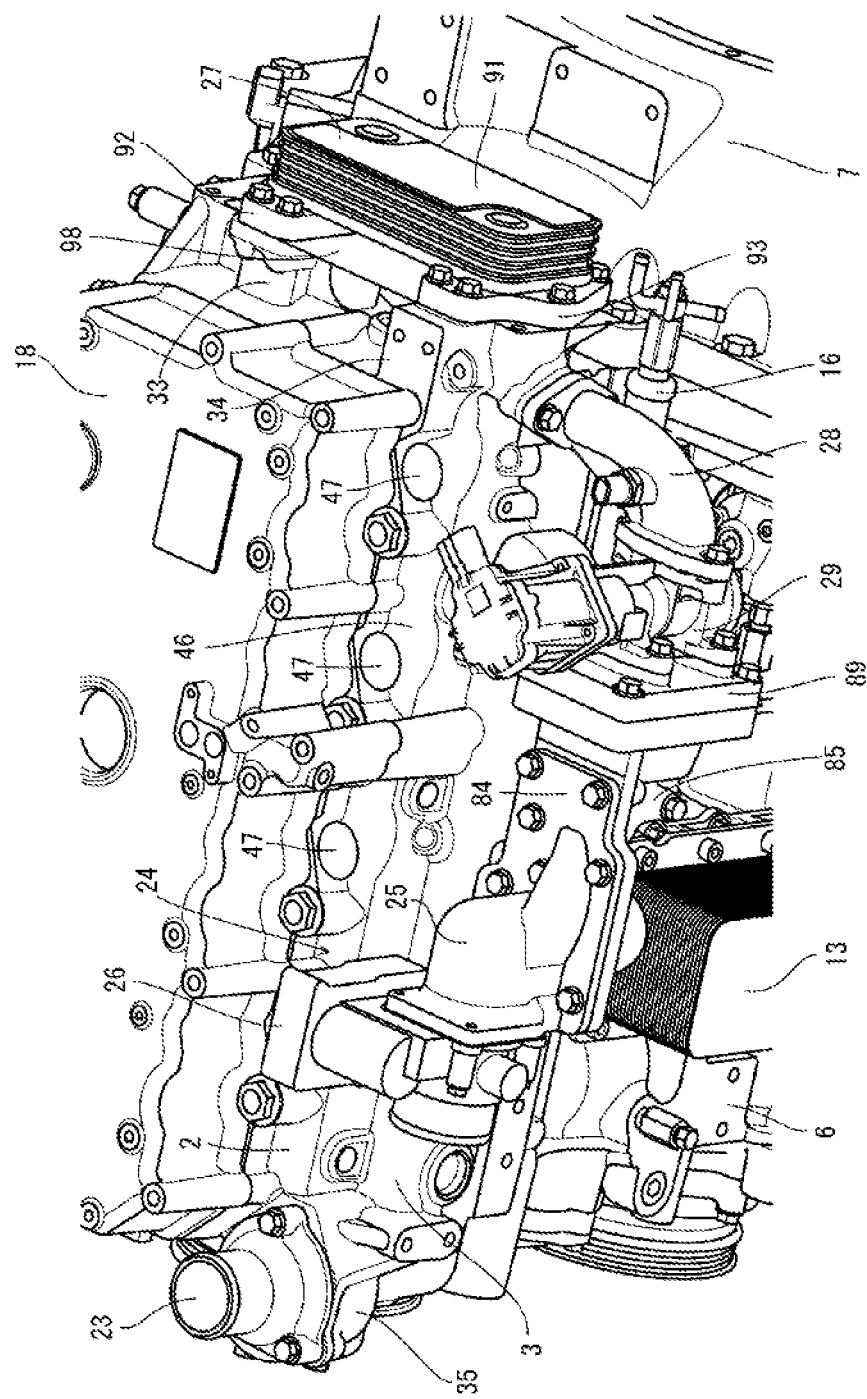
[FIG. 9] An enlarged perspective view of a cylinder head as viewed from an intake manifold side.
Figure 10:
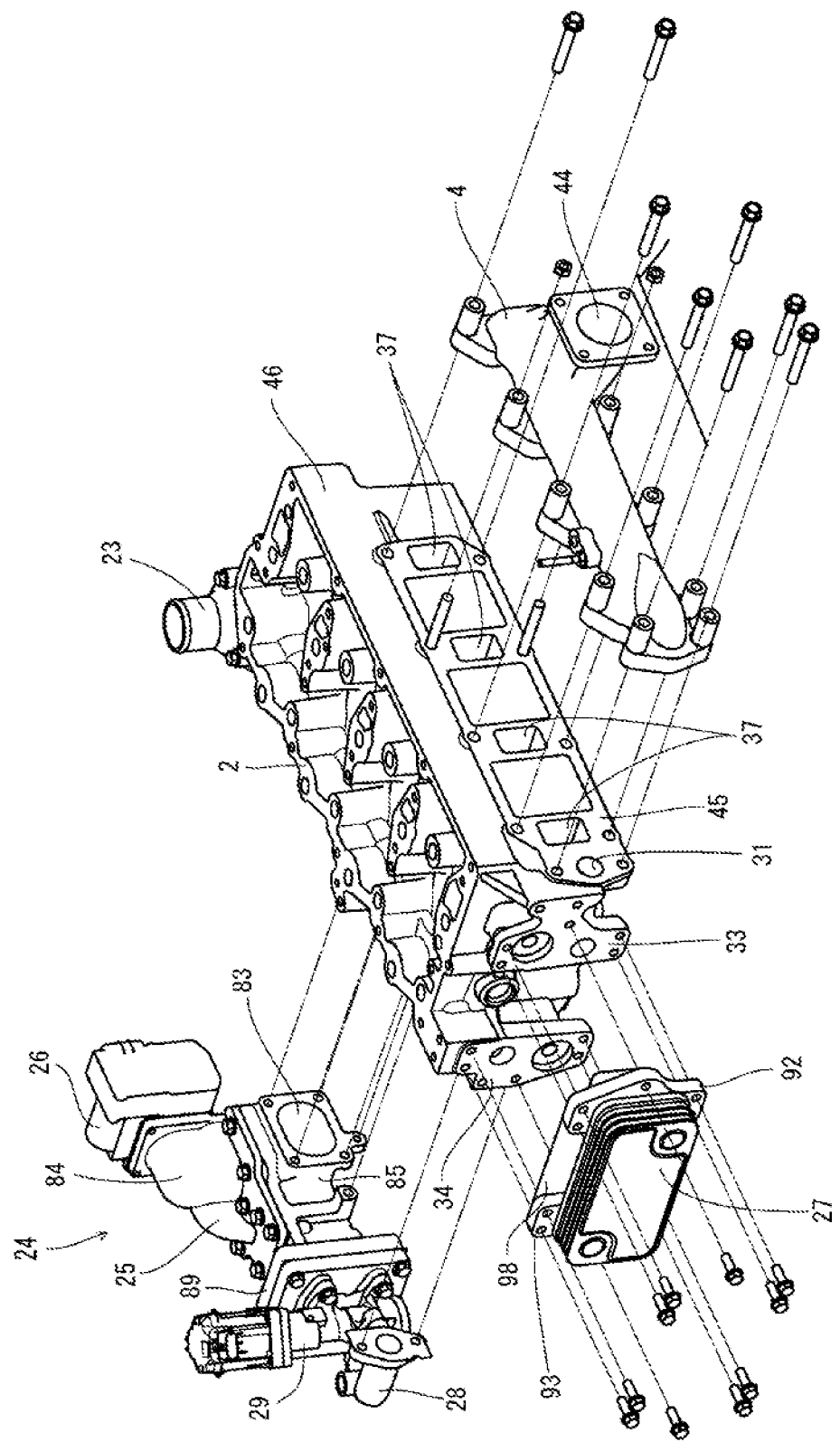
[FIG. 10] An exploded perspective view of the cylinder head as viewed from an exhaust manifold side.
Figure 11:
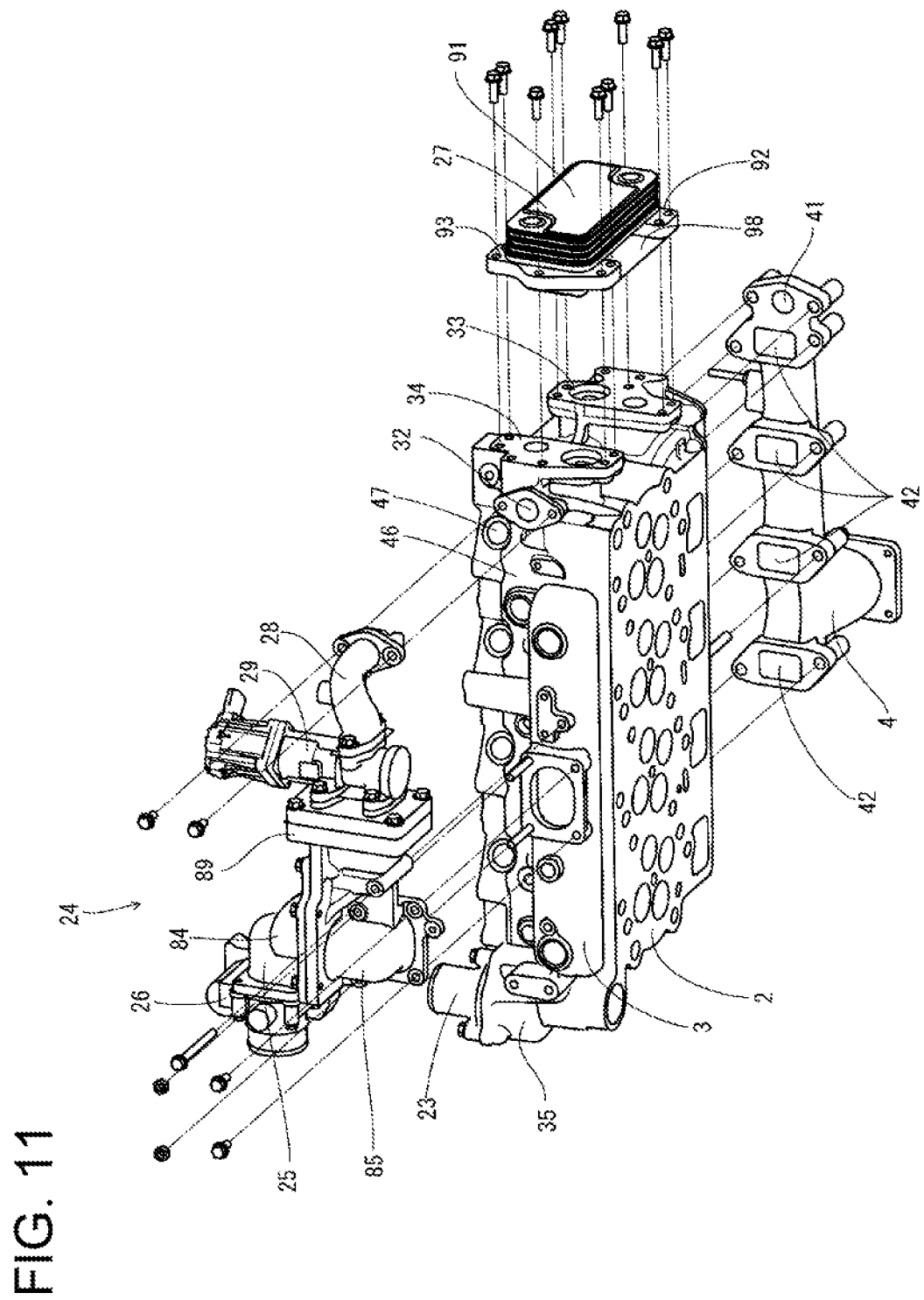
[FIG. 11] Am exploded perspective view of the cylinder head as viewed from the intake manifold side.
Figure 12:
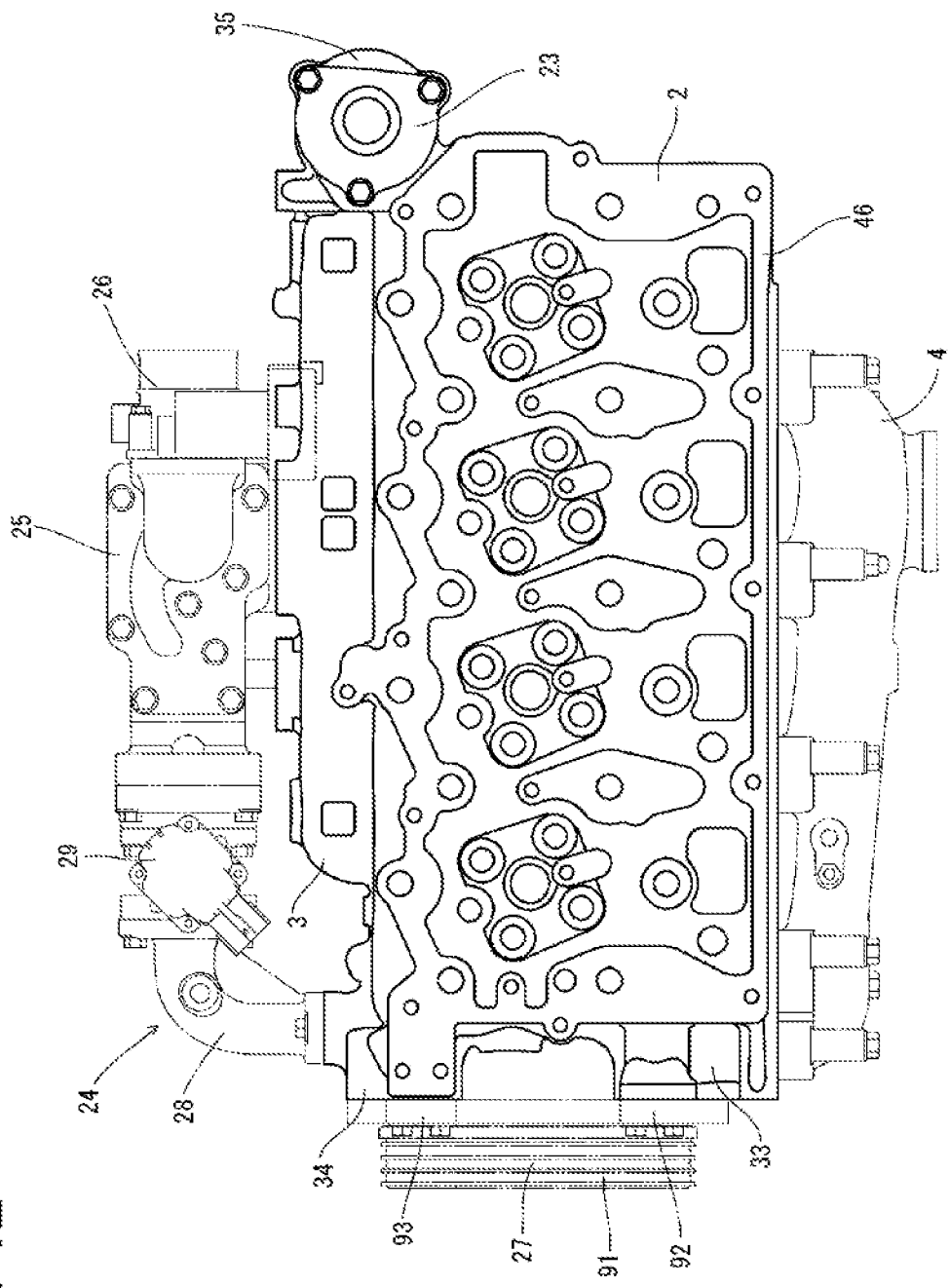
[FIG. 12] A top plan view of the cylinder head.
Figure 13:
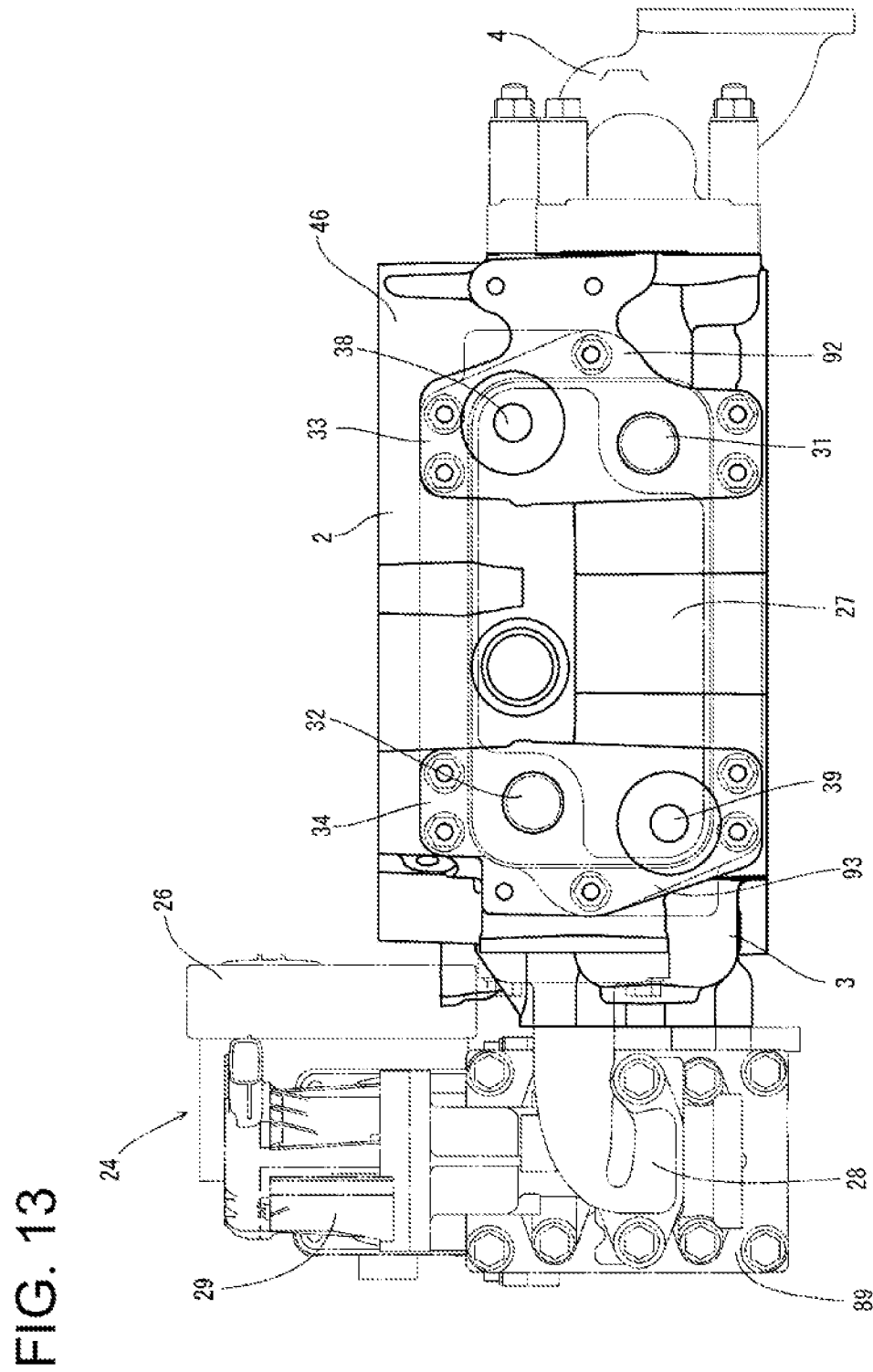
[FIG. 13] A front view of the cylinder head.
Figure 14:
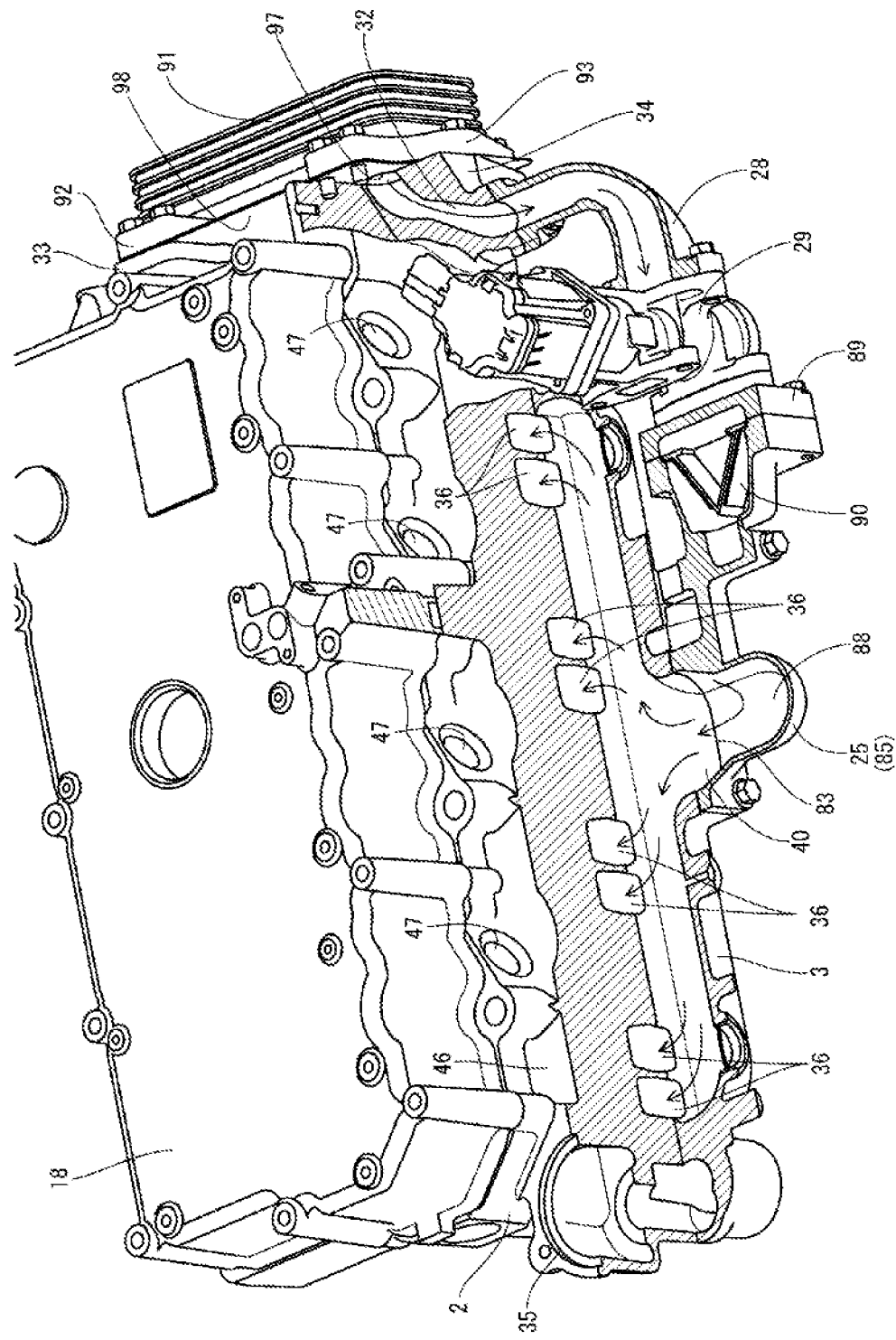
[FIG. 14] A perspective cross-sectional view of the cylinder head and an EGR device.
Figure 15:
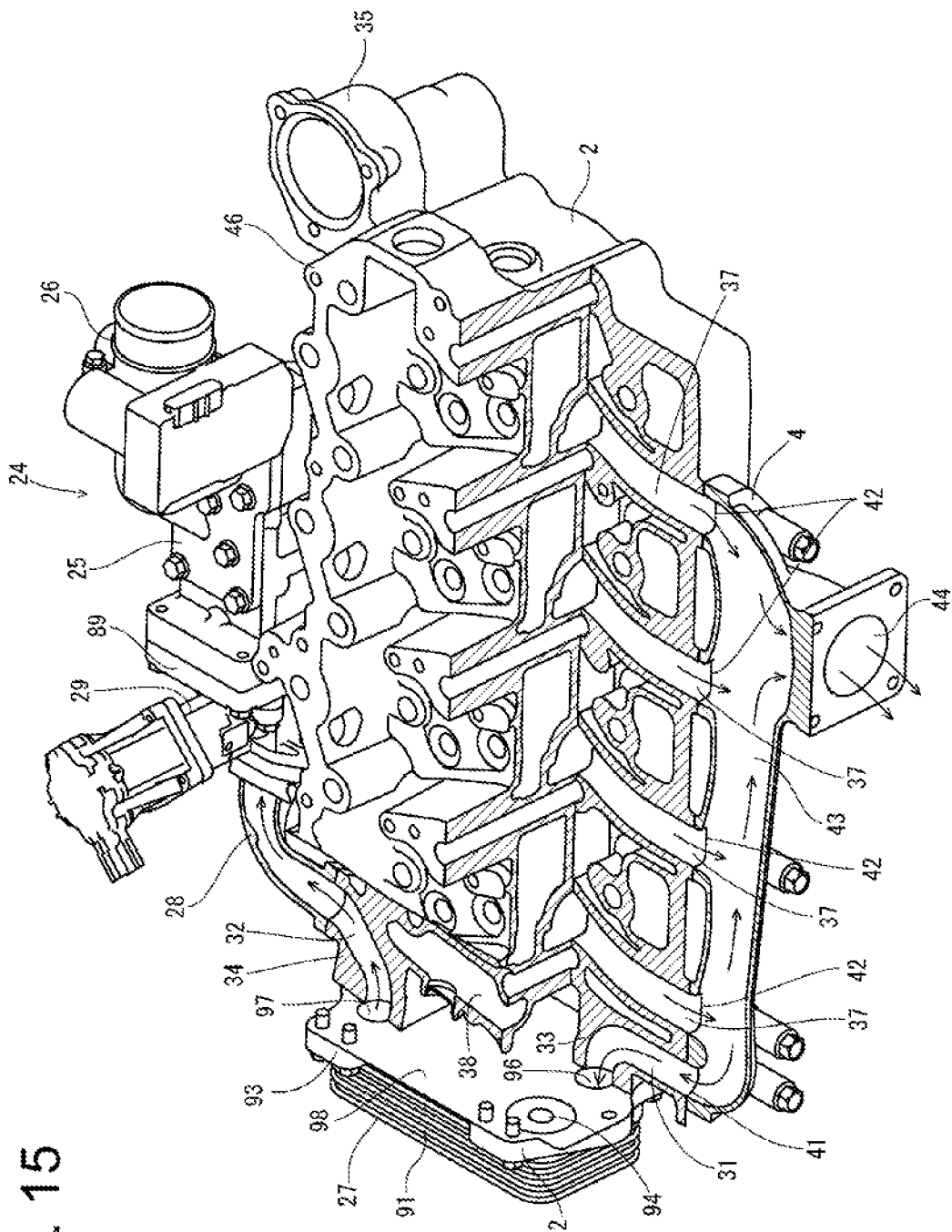
[FIG. 15] A perspective cross-sectional view of the cylinder head and the exhaust manifold.
Figure 16:
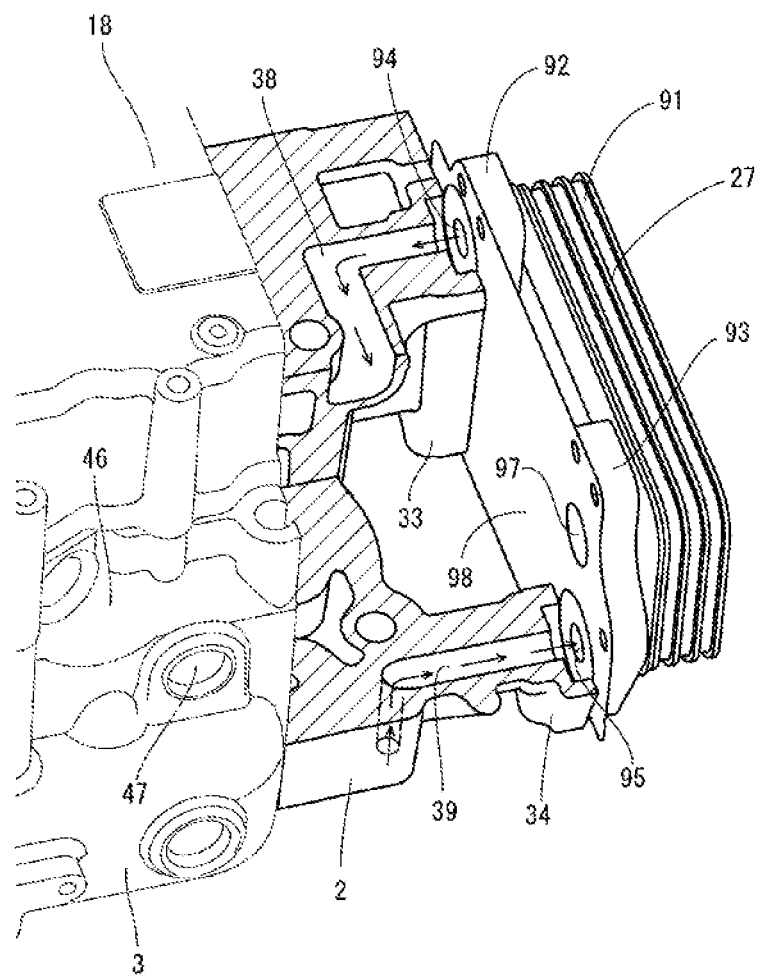
[FIG. 16] A perspective cross-sectional view of a coupling portion of the cylinder head coupled to an EGR cooler.
Figure 17:
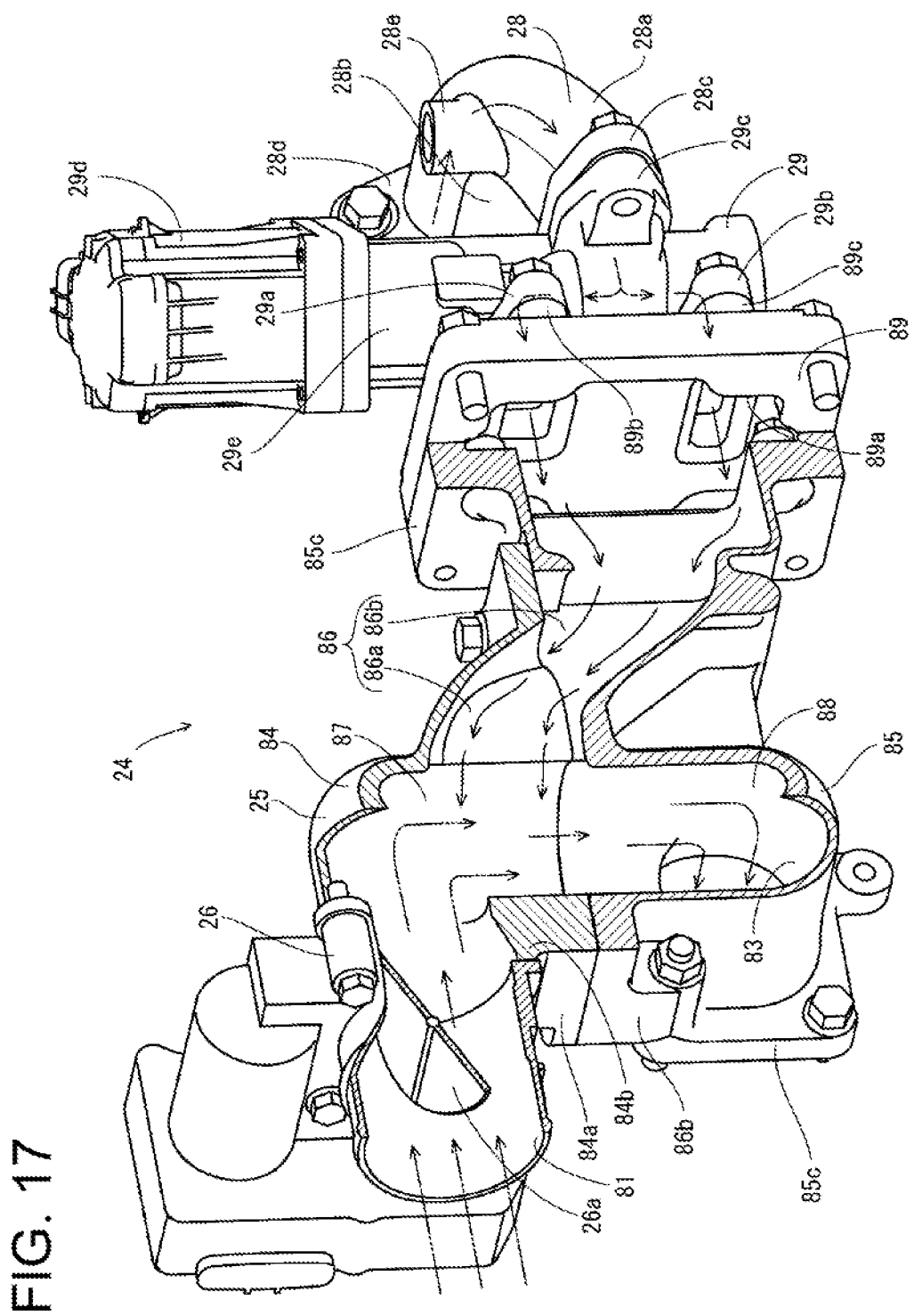
[FIG. 17] A perspective cross-sectional view of the EGR device.
Figure 18:
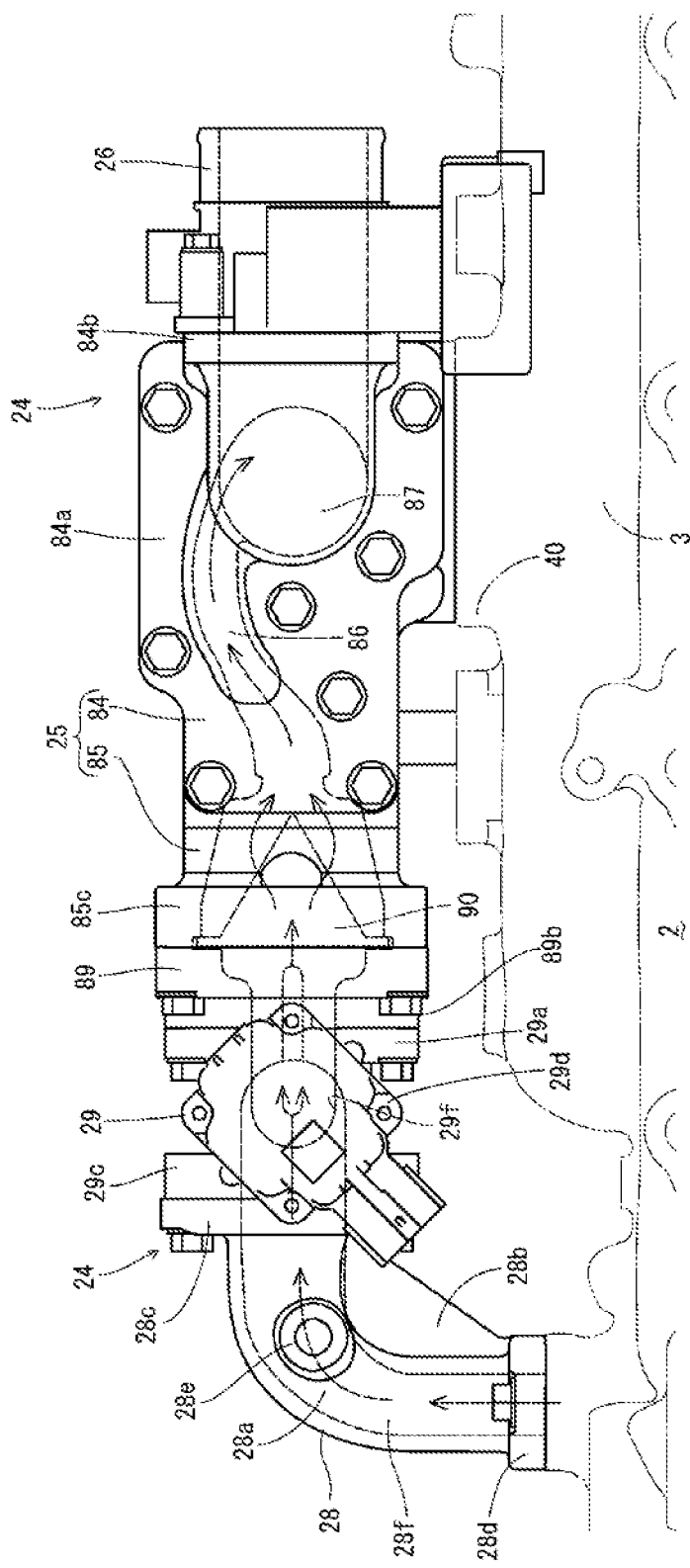
[FIG. 18] A top plan view of the EGR device.
Figure 19:
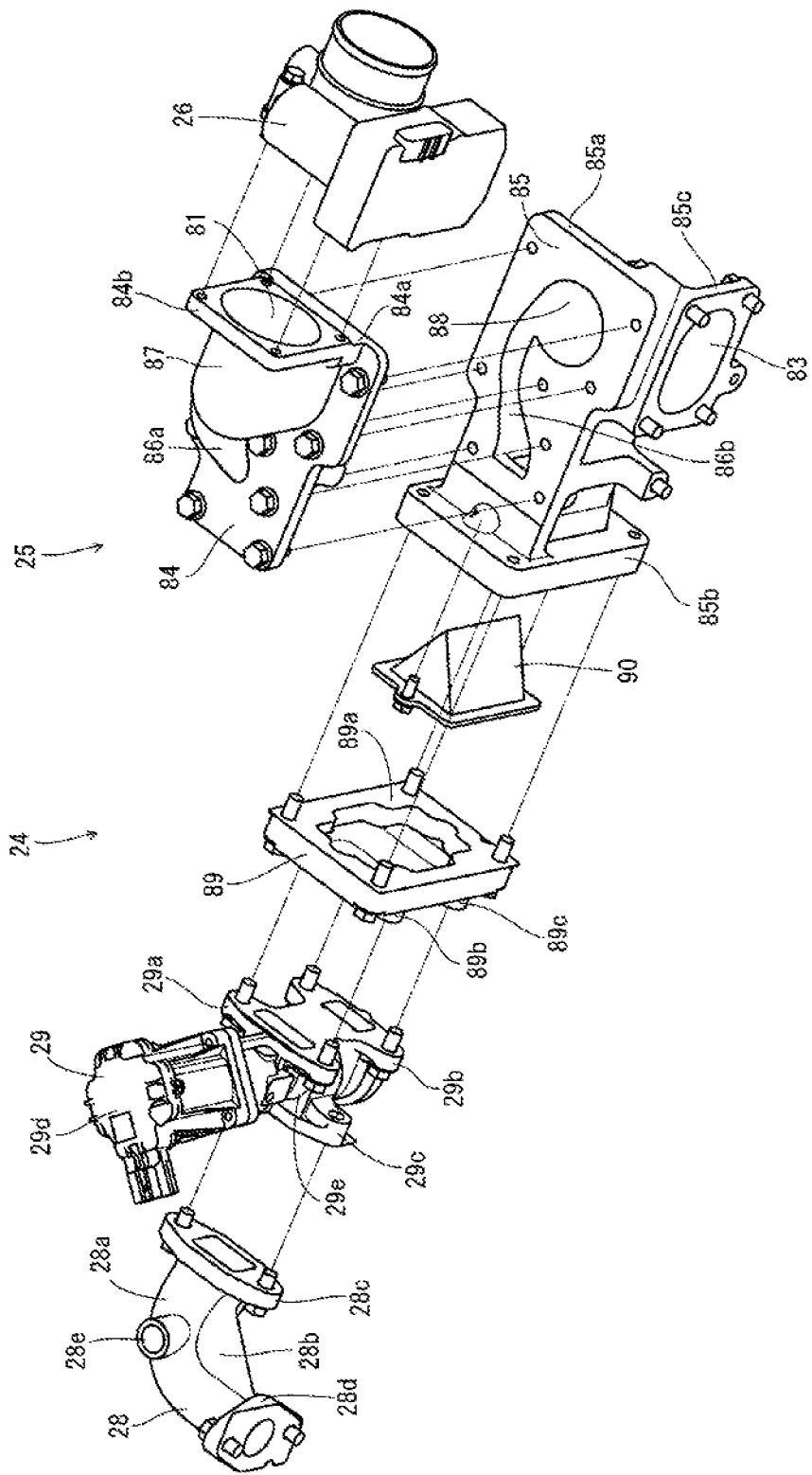
[FIG. 19] An exploded perspective view of the EGR device.
Figure 20:
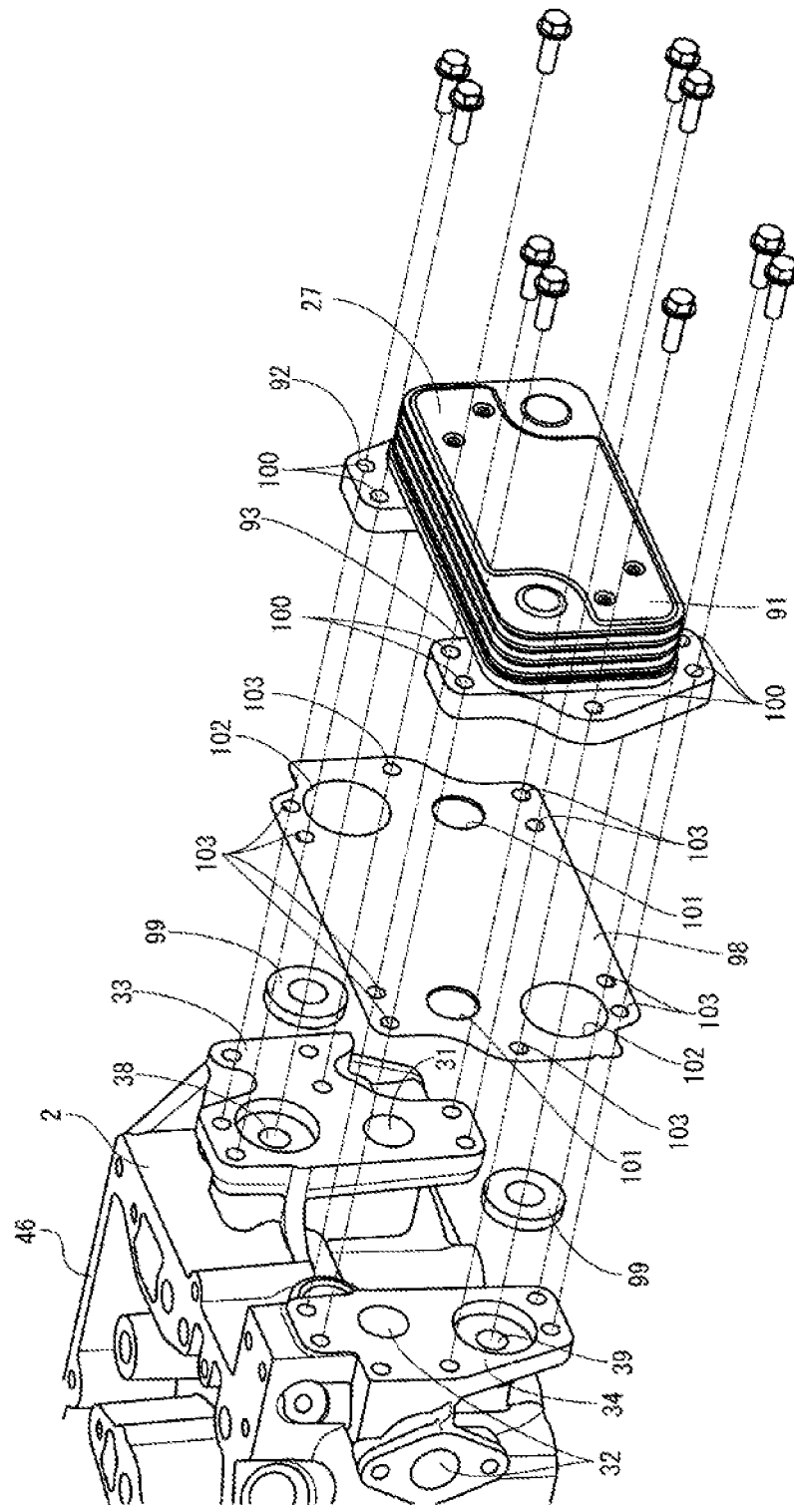
[FIG. 20] An exploded view of the coupling portion of the cylinder head coupled to the EGR cooler.
Figure 21:
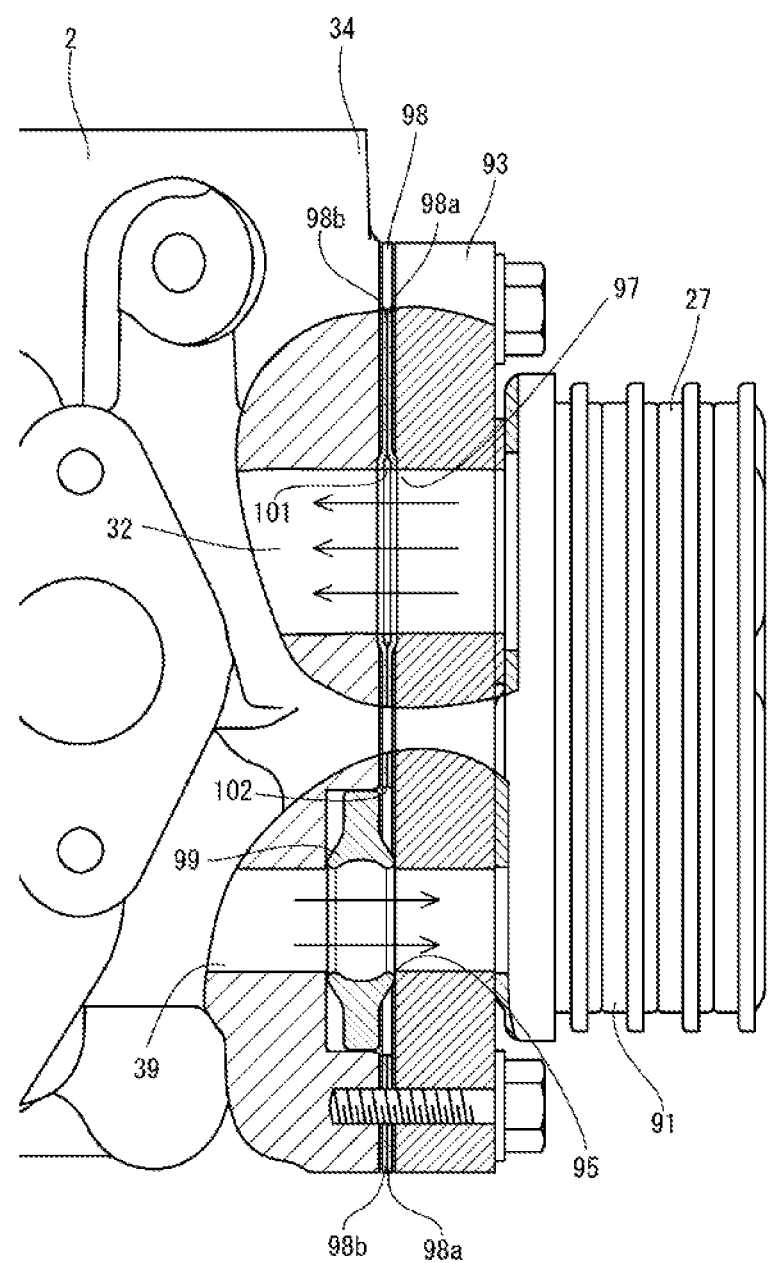
[FIG. 21] A cross-sectional view of the coupling portion of the cylinder head coupled to the EGR cooler.
Figure 22:
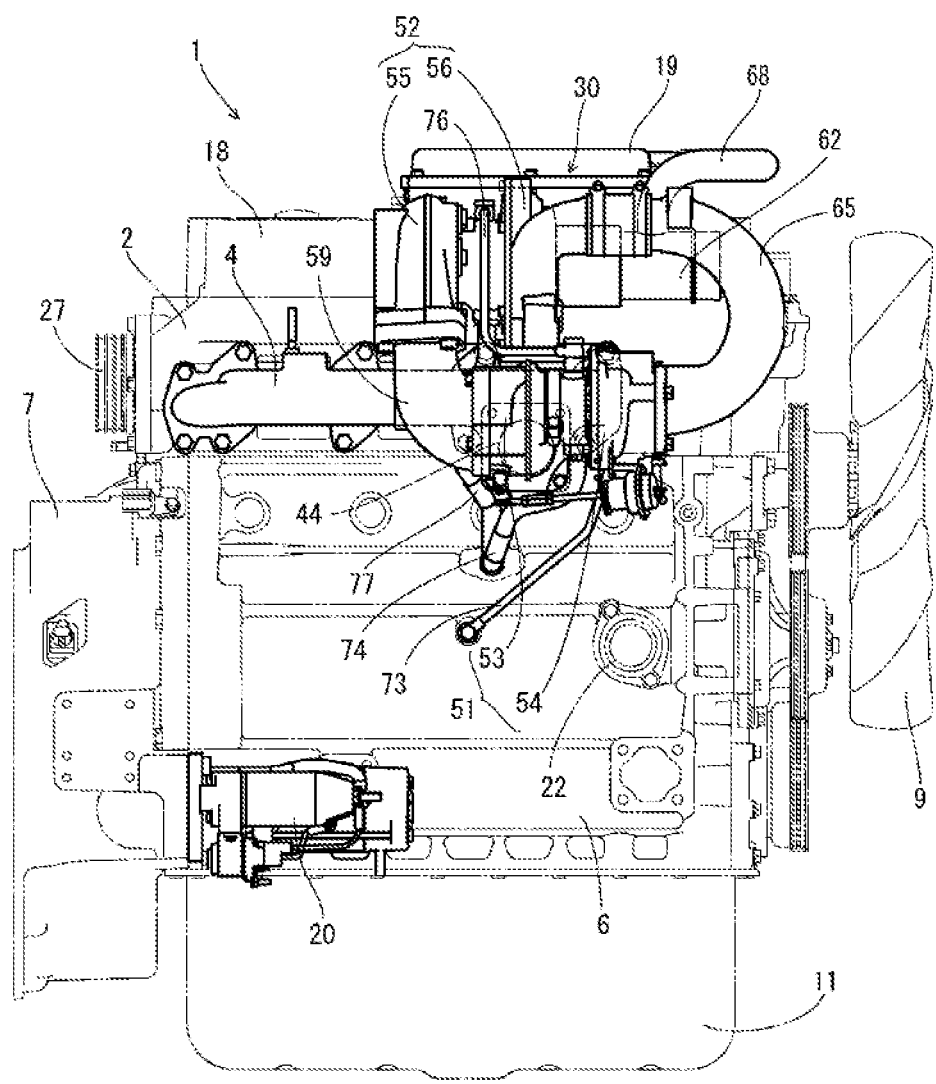
[FIG. 22] A left side view of the engine for illustrating arrangement of a two-stage turbocharger.
Figure 23:
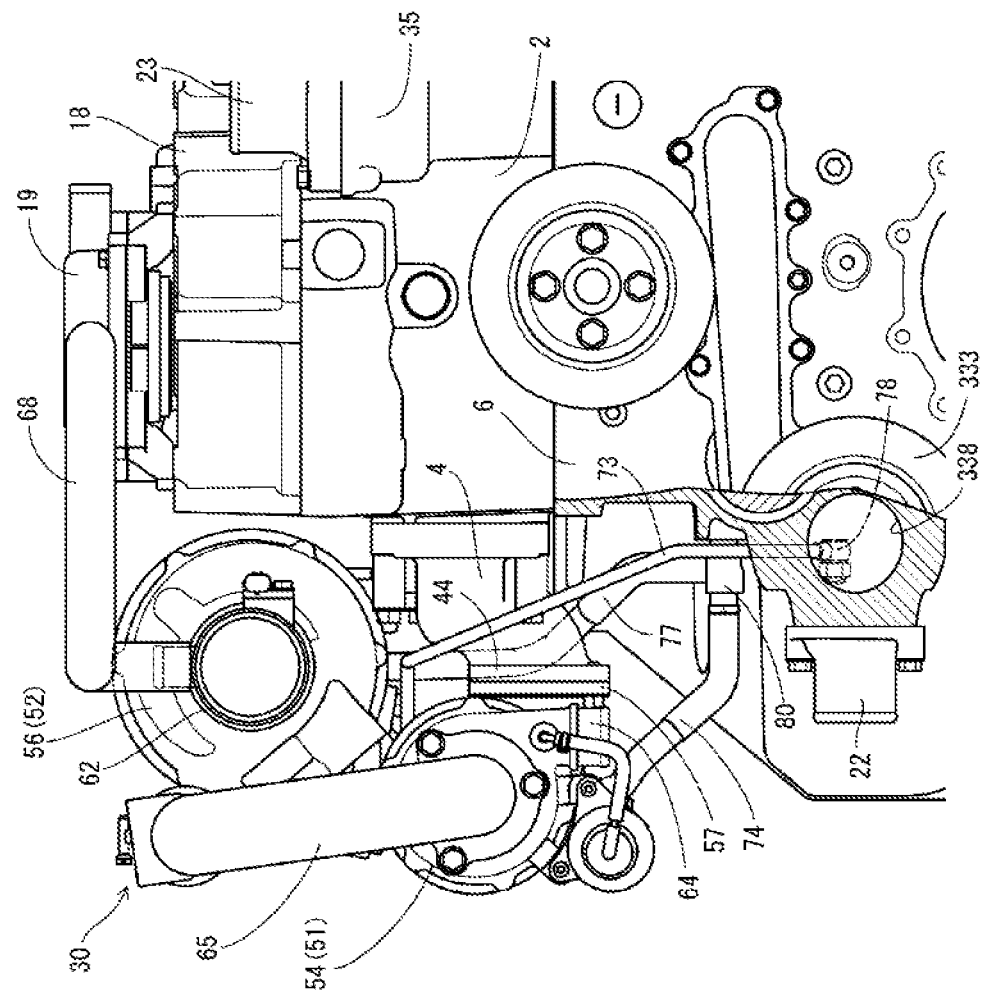
[FIG. 23] An enlarged rear view of the engine.
Figure 24:
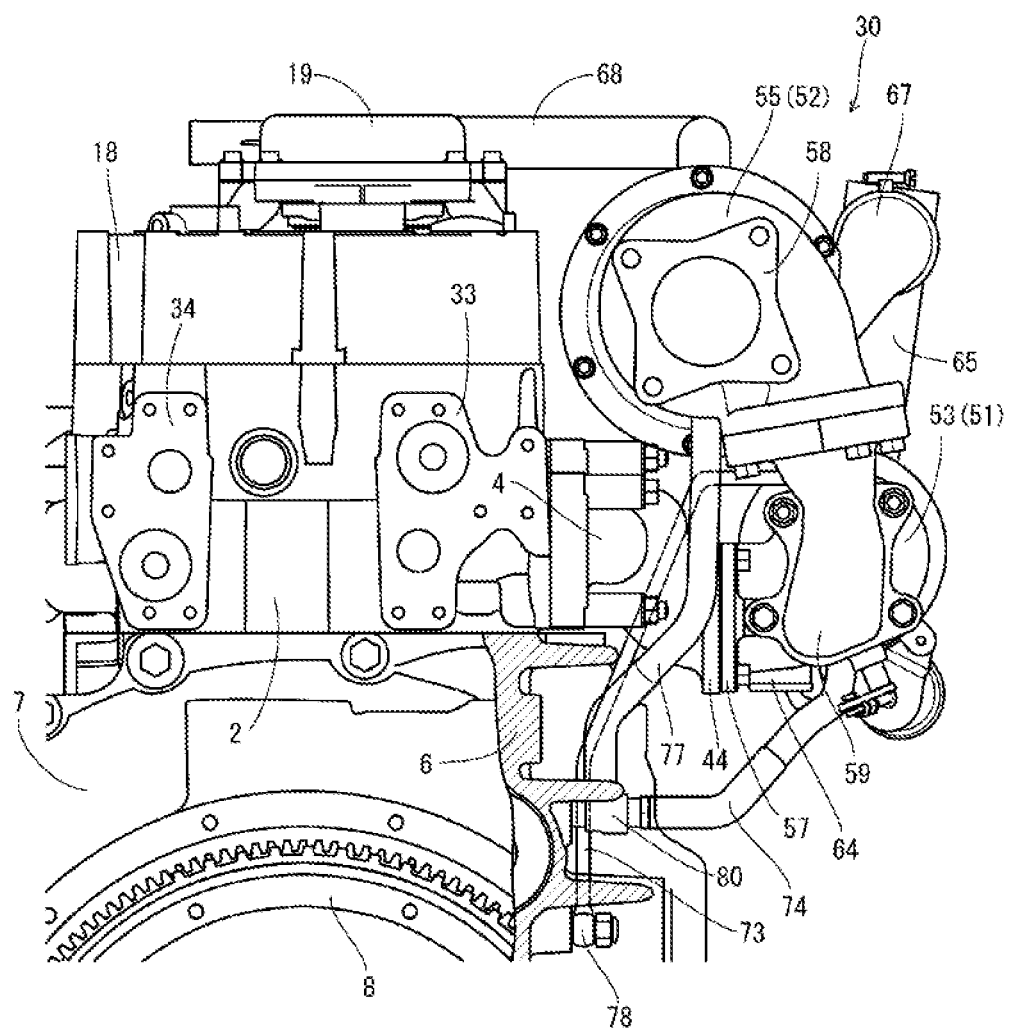
[FIG. 24] An enlarged front view of the engine.
Figure 25:
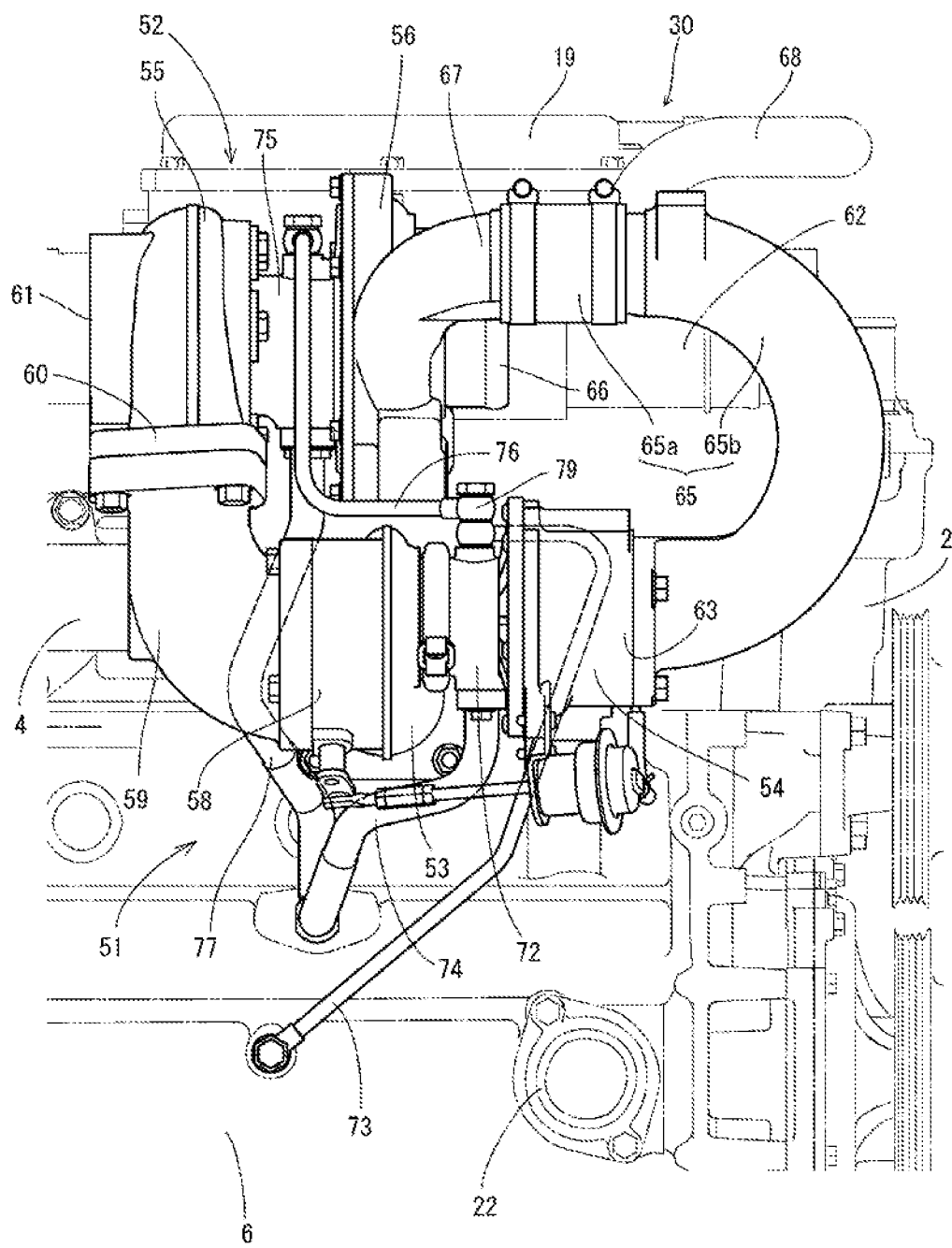
[FIG. 25] A left side view of the two-stage turbocharger.
Figure 26:
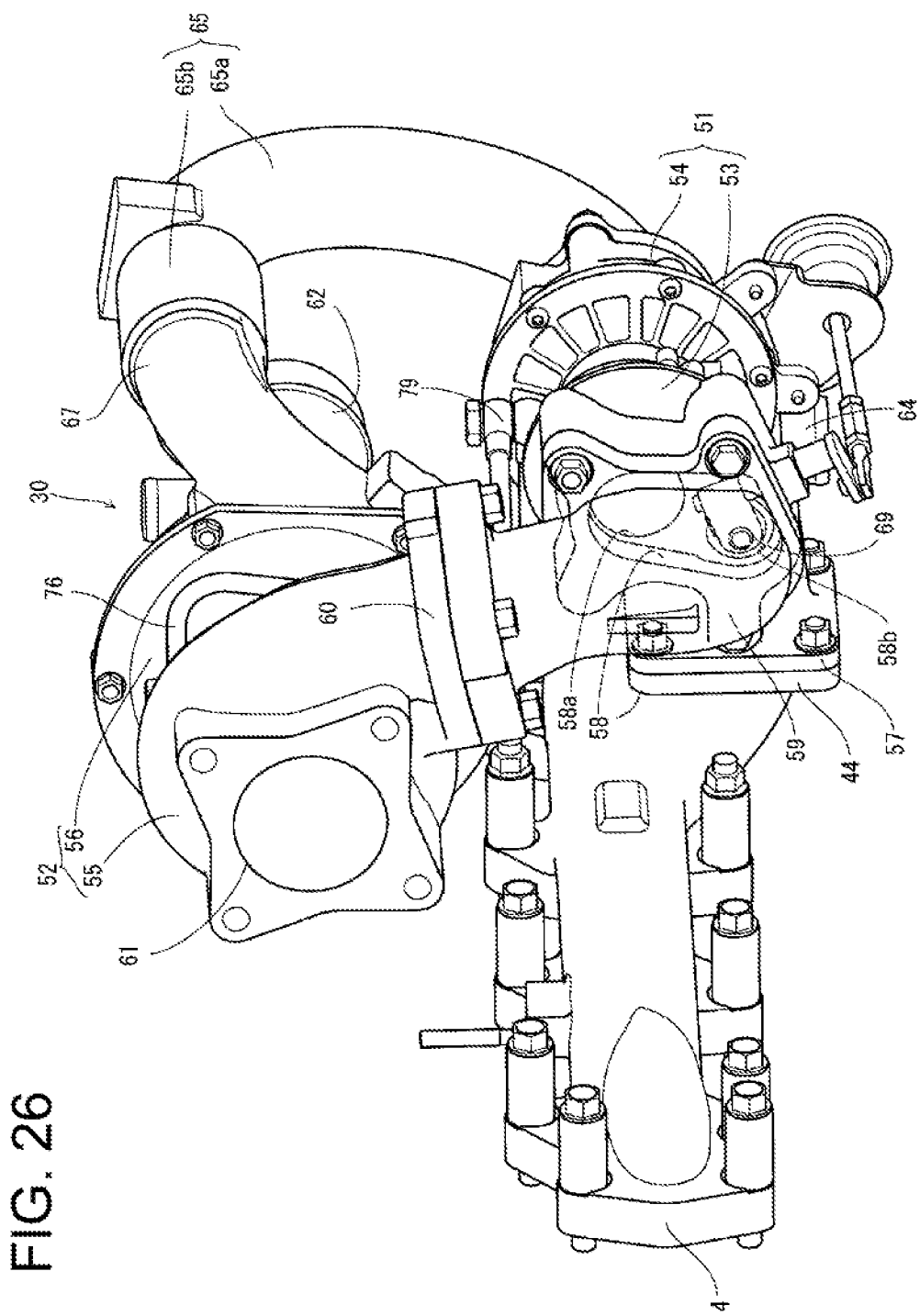
[FIG. 26] A perspective view of the two-stage turbocharger.
Figure 27:
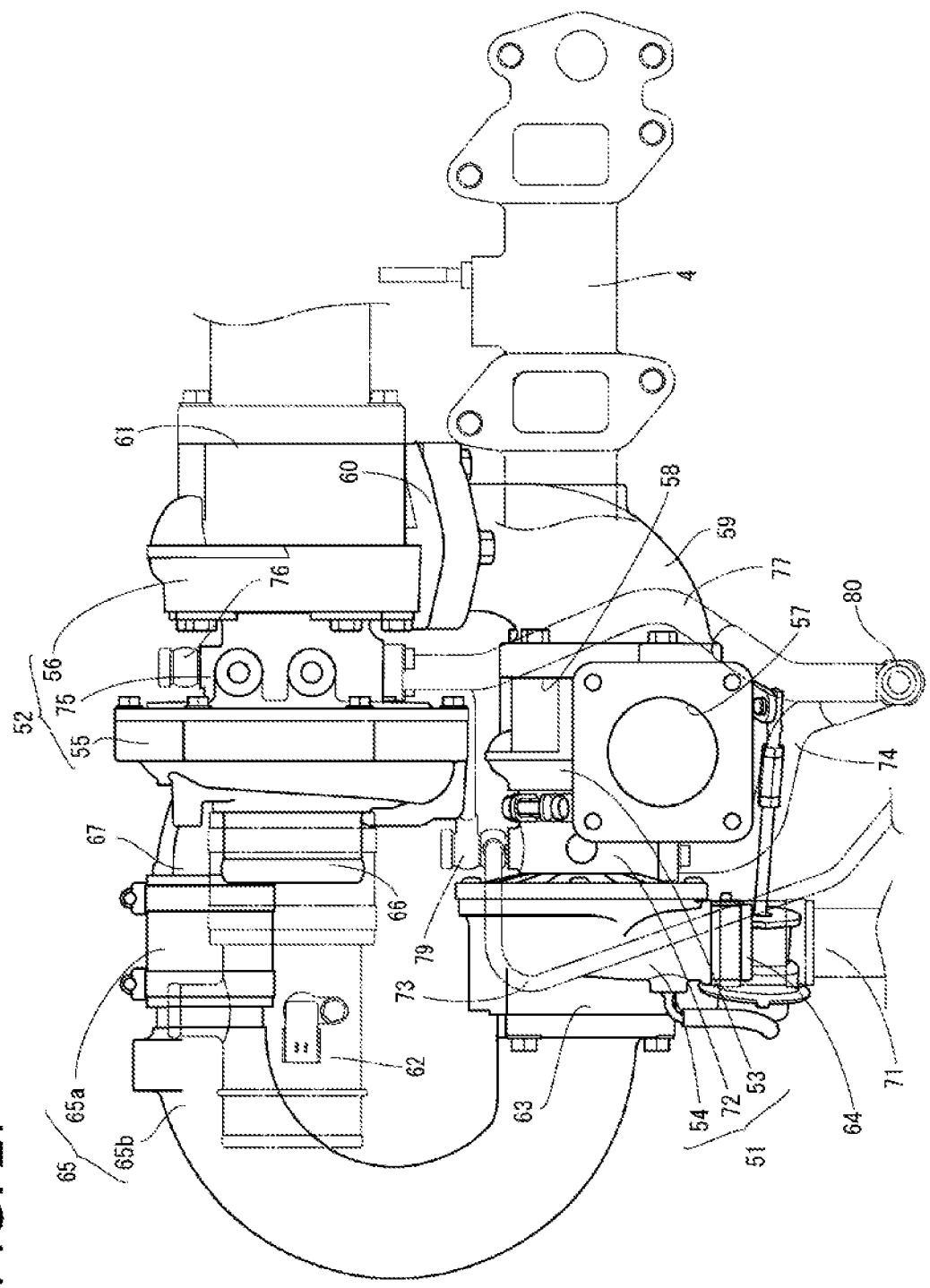
[FIG. 27] A right side view of the two-stage turbocharger.

In the following, an embodiment of the present invention will be described with reference to the drawings. First, referring to FIG. 1 to FIG. 8, an overall structure of a diesel engine (engine device) 1 will be described. In the descriptions below, opposite side portions parallel to a crankshaft 5 (side portions on opposite sides relative to the crankshaft 5) will be defined as left and right, a side where a flywheel housing 7 is disposed will be defined as front, and a side where a cooling fan 9 is disposed will be defined as rear. For convenience, these are used as a benchmark for a positional relationship of left, right, front, rear, up, and down in the diesel engine 1.

As shown in FIG. 1 to FIG. 8, an intake manifold 3 and an exhaust manifold 4 are disposed in one side portion and the other side portion of the diesel engine 1 parallel to the crankshaft 5. In the embodiment, the intake manifold 3 provided on a right surface of a cylinder head 2 is formed integrally with the cylinder head 2. The exhaust manifold 4 is provided on a left surface of the cylinder head 2. The cylinder head 2 is mounted on a cylinder block 6 in which the crankshaft 5 and a piston (not shown) are disposed.

The crankshaft 5 has its front and rear distal ends protruding from front and rear surfaces of the cylinder block 6. The flywheel housing 7 is fixed to one side portion of the diesel engine 1 (in the embodiment, a front surface side of the cylinder block 6) intersecting the crankshaft 5. A flywheel 8 is disposed in the flywheel housing 7. The flywheel 8, which is pivotally supported on the front end side of the crankshaft 5, is configured to rotate integrally with the crankshaft 5. The flywheel 8 is configured such that power of the diesel engine 1 is extracted to an actuating part of a work machine (for example, a hydraulic shovel, a forklift, or the like) through the flywheel 8. The cooling fan 9 is disposed in the other side portion of the diesel engine 1 (in the embodiment, a rear surface side of the cylinder block 6) intersecting the crankshaft 5. A rotational force is transmitted from the rear end side of the crankshaft 5 to the cooling fan 9 through a V-belt 10.

An oil pan 11 is disposed on a lower surface of the cylinder block 6. A lubricant is stored in the oil pan 11. The lubricant in the oil pan 11 is suctioned by an oil pump (not shown) disposed on the right surface side of the cylinder block 6, the oil pump being arranged in a coupling portion where the cylinder block 6 is coupled to the flywheel housing 7. The lubricant is then supplied to lubrication parts of the diesel engine 1 through an oil cooler 13 and an oil filter 14 that are disposed on the right surface of the cylinder block 6. The lubricant supplied to the lubrication parts is then returned to the oil pan 11. The oil pump (not shown) is configured to be driven by rotation of the crankshaft 5.

In the coupling portion where the cylinder block 6 is coupled to the flywheel housing 7, a fuel feed pump 15 for feeding a fuel is attached. The fuel feed pump 15 is disposed below an EGR device 24. A common rail 16 is fixed to a side surface of the cylinder block 6 at a location below the intake manifold 3 of the cylinder head 2. The common rail 16 is disposed above the fuel feed pump 15. Injectors (not shown) for four cylinders are provided on an upper surface of the cylinder head 2 which is covered with a head cover 18. Each of the injectors has a fuel injection valve of electromagnetic-controlled type.

Each of the injectors is connected to a fuel tank (not shown) through the fuel feed pump 15 and the common rail 16 having a cylindrical shape. The fuel tank is mounted in a work vehicle. A fuel in the fuel tank is pressure-fed from the fuel feed pump 15 to the common rail 16, so that a high-pressure fuel is stored in the common rail 16. By controlling the opening/closing of the fuel injection valves of the injectors, the high-pressure fuel in the common rail 16 is injected from the injectors to the respective cylinders of the diesel engine 1.

A blow-by gas recirculation device 19 is provided on an upper surface of the head cover 18 covering intake and exhaust valves (not shown), etc. disposed on the upper surface of the cylinder head 2. The blow-by gas recirculation device 19 takes in a blow-by gas that has leaked out of a combustion chamber of the diesel engine 1 or the like toward the upper surface of the cylinder head 2. A blow-by gas outlet of the blow-by gas recirculation device 19 is in communication with an intake part of a two-stage turbocharger 30 through a recirculation hose 68. A blow-by gas, from which a lubricant component is removed in the blow-by gas recirculation device 19, is then recirculated to the intake manifold 3 via the two-stage turbocharger 30.

An engine starting starter 20 is attached to the flywheel housing 7. The engine starting starter 20 is disposed below the exhaust manifold 4. A position where the engine starting starter 20 is attached to the flywheel housing 7 is below a coupling portion where the cylinder block 6 is coupled to the flywheel housing 7.

A coolant pump 21 for smoothing a coolant is provided in a portion of the rear surface of the cylinder block 6, the portion being a little left-hand. The coolant pump 21 is disposed below the cooling fan 9. Rotation of the crankshaft 5 causes the coolant pump 21 as well as the cooling fan 9 to be driven through the cooling fan driving V-belt 10. Driving the coolant pump 21 causes a coolant in a radiator (not shown) mounted in the work vehicle to be supplied to the coolant pump 21. The coolant is then supplied to the cylinder head 2 and the cylinder block 6, to cool the diesel engine 1.

A coolant inlet pipe 22 disposed below the exhaust manifold 4 is provided on the left surface of the cylinder block 6 and is fixed at a height equal to the height of the coolant pump 21. The coolant inlet pipe 22 is in communication with a coolant outlet of the radiator. A coolant outlet pipe 23 that is in communication with a coolant inlet of the radiator is fixed at a position above a rear surface of the cylinder head 2. The cylinder head 2 has a coolant drainage 35 that protrudes rearward from the intake manifold 3. The coolant outlet pipe 23 is provided on an upper surface of the coolant drainage 35.

The inlet side of the intake manifold 3 is coupled to an air cleaner (not shown) via a collector (EGR main body case) 25 of an EGR device 24 (exhaust-gas recirculation device) which will be described later. Fresh air (outside air) suctioned by the air cleaner is subjected to dust removal and purification in the air cleaner, then fed to the intake manifold 3 through the collector 25, and then supplied to the respective cylinders of the diesel engine 1. In the embodiment, the collector 25 of the EGR device 24 is coupled to the right side of the intake manifold 3 which is formed integrally with the cylinder head 2 to form the right surface of the cylinder head 2. That is, an outlet opening of the collector 25 of the EGR device 24 is coupled to an inlet opening of the intake manifold 3 provided on the right surface of the cylinder head 2. In this embodiment, the collector 25 of the EGR device 24 is coupled to the air cleaner via an intercooler (not shown) and the two-stage turbocharger 30, as will be described later.

The EGR device 24 includes: the collector 25 serving as a relay pipe passage that mixes a recirculation exhaust gas of the diesel engine 1 (an EGR gas from the exhaust manifold 4) with fresh air (outside air from the air cleaner), and supplies a mixed gas to the intake manifold 3; an intake throttle member 26 that communicates the collector 25 with the air cleaner; a recirculation exhaust gas tube 28 that constitutes a part of a recirculation flow pipe passage connected to the exhaust manifold 4 via an EGR cooler 27; and an EGR valve member 29 that communicates the collector 25 with the recirculation exhaust gas tube 28.

The EGR device 24 is disposed on the right lateral side of the intake manifold 3 in the cylinder head 2. The EGR device 24 is fixed to the right surface of the cylinder head 2, and is in communication with the intake manifold 3 in the cylinder head 2. In the EGR device 24, the collector 25 is coupled to the intake manifold 3 on the right surface of the cylinder head 2, and an EGR gas inlet of the recirculation exhaust gas tube 28 is coupled and fixed to a front portion of the intake manifold 3 on the right surface of the cylinder head 2. The EGR valve member 29 and the intake throttle member 26 are coupled to the front and rear of the collector 25, respectively. An EGR gas outlet of the recirculation exhaust gas tube 28 is coupled to the rear end of the EGR valve member 29.

The EGR cooler 27 is fixed to the front surface of the cylinder head 2. The coolant and the EGR gas flowing in the cylinder head 2 flows into and out of the EGR cooler 27. In the EGR cooler 27, the EGR gas is cooled. EGR cooler coupling bases 33, 34 for coupling the EGR cooler 27 to the front surface of the cylinder head 2 protrude from left and right portions of the front surface of the cylinder head 2. The EGR cooler 27 is coupled to the coupling bases 33, 34. That is, the EGR cooler 27 is disposed on the front side of the cylinder head 2 and at a position above the flywheel housing 7 such that a rear end surface of the EGR cooler 27 and the front surface of the cylinder head 2 are spaced from each other.

The two-stage turbocharger 30 is disposed on a lateral side (in the embodiment, the left lateral side) of the exhaust manifold 4. The two-stage turbocharger 30 includes a high-pressure turbocharger 51 and a low-pressure turbocharger 52. The high-pressure turbocharger 51 includes a high-pressure turbine 53 in which a turbine wheel (not shown) is provided and a high-pressure compressor 54 in which a blower wheel (not shown) is provided. The low-pressure turbocharger 52 includes a low-pressure turbine 55 in which a turbine wheel (not shown) is provided and a low-pressure compressor 56 in which a blower wheel (not shown) is provided.

An exhaust gas inlet 57 of the high-pressure turbine 53 is coupled to the exhaust manifold 4. An exhaust gas inlet 60 of the low-pressure turbine 55 is coupled to an exhaust gas outlet 58 of the high-pressure turbine 53 via a high-pressure exhaust gas tube 59. An exhaust gas introduction side end portion of an exhaust gas discharge pipe (not shown) is coupled to an exhaust gas outlet 61 of the low-pressure turbine 55. A fresh air supply side (fresh air outlet side) of the air cleaner (not shown) is connected to a fresh air inlet port (fresh air inlet) 63 of the low-pressure compressor 56 via an air supply pipe 62. A fresh air inlet port 66 of the high-pressure compressor 54 is coupled to a fresh air supply port (fresh air outlet) 64 of the low-pressure compressor 56 via a low-pressure fresh air passage pipe 65. A fresh air introduction side of the intercooler (not shown) is connected to a fresh air supply port 67 of the high-pressure compressor 54 via a high-pressure fresh air passage pipe 71.

The high-pressure turbocharger 51 is coupled to the exhaust gas outlet 58 of the exhaust manifold 4, and is fixed to the left lateral side of the exhaust manifold 4. On the other hand, the low-pressure turbocharger 52 is coupled to the high-pressure turbocharger 51 via the high-pressure exhaust gas tube 59 and the low-pressure fresh air passage pipe 65, and is fixed above the exhaust manifold 4. Thus, the exhaust manifold 4 and the high-pressure turbocharger 51 with a small diameter are disposed side-by-side with respect to the left-right direction below the low-pressure turbocharger 52 with a large diameter. As a result, the two-stage turbocharger 30 is arranged so as to surround the left surface and the upper surface of the exhaust manifold 4. That is, the exhaust manifold 4 and the two-stage turbocharger 30 are arranged so as to form a rectangular shape in a rear view (or front view), and are compactly fixed to the left surface of the cylinder head 2.

Next, referring to FIG. 9 to FIG. 16, a configuration of the cylinder head 2 will be described. As shown in FIG. 9 to FIG. 16, the cylinder head 2 is provided with a plurality of intake fluid passages 36 for taking fresh air into a plurality of intake ports (not shown) and a plurality of exhaust fluid passages 37 for emitting an exhaust gas from a plurality of exhast ports. The intake manifold 3 which aggregates the plurality of intake fluid passages 36 is formed integrally with a right side portion of the cylinder head 2. Since the cylinder head 2 is integrated with the intake manifold 3, a gas sealability between the intake manifold 3 and the intake fluid passages 36 can be enhanced, and in addition, the rigidity of the cylinder head 2 can be increased.

The cylinder head 2 is configured such that the exhaust manifold 4 is coupled to the left surface of the cylinder head 2 which is opposite to the right surface where the intake manifold 3 is provided, and the EGR cooler 27 is coupled to the front surface (a surface on the flywheel housing 7 side) of the cylinder head 2 which is adjacent to the left and right surfaces. Coupling bases (EGR cooler coupling bases) 33, 34 to which the EGR cooler 27 is coupled are provided so as to protrude from the front surface of the cylinder head 2. The coupling bases 33, 34 are provided therein with EGR gas fluid passages (EGR gas relay fluid passages) 31, 32 and coolant passages (coolant relay fluid passages) 38, 39.

Since the EGR gas relay fluid passages 31, 32 and the coolant passages 38, 39 are provided in the coupling bases 33, 34 to which the EGR cooler 27 is coupled, it is not necessary that coolant piping and EGR gas piping are disposed between the EGR cooler 27 and the cylinder head 2. This can give a sealability to a coupling portion coupled to the EGR cooler 27 without any influence of, for example, extension and contraction of piping caused by the EGR gas or the coolant. This can also enhance a resistance (structural stability) against external fluctuation factors such as heat and vibration, and moreover can make the configuration compact.

The cylinder head 2 includes an upstream EGR gas relay fluid passage 31 through which a front portion of the left surface is in communication with the front surface. An EGR gas outlet 41 disposed at the front end of the exhaust manifold 4 is in communication with the upstream EGR gas relay fluid passage 31. The cylinder head 2 also includes a downstream EGR gas relay fluid passage 32 through which a front portion of the right surface (on the front side of the intake manifold 3) is in communication with the front surface. The EGR gas inlet of the recirculation exhaust gas tube 28 is in communication with the downstream EGR gas relay fluid passage 32. The cylinder head 2 has the EGR cooler coupling bases 33, 34 which are formed by left and right edges of the front surface of the cylinder head 2 (a front-left corner portion and a front-right corner portion of the cylinder head 2) being protruded frontward. The upstream EGR gas relay fluid passage 31 is provided inside the coupling base 33, and the downstream EGR gas relay fluid passage 32 is provided inside the coupling base 34.

The EGR device 24 is coupled to the intake manifold 3 which is provided on the right surface of the cylinder head 2 so as to protrude therefrom. The intake manifold 3 is disposed in a portion of the right surface of the cylinder head 2, the portion being relatively close to the rear side (the cooling fan 9 side). The intake manifold 3 is formed by a lower portion of the right surface of the cylinder head 2 being protruded rightward. The intake manifold 3 has an intake inlet 40 at its middle portion with respect to the front-rear direction. An intake outlet 83 of the collector 25 of the EGR device 24 is coupled to the intake inlet 40 of the intake manifold 3 which protrudes from the right surface of the cylinder head 2, and the EGR device 24 is fixed to the right lateral side of the cylinder head 2.

On the front side (the flywheel housing 7 side) of the right surface of the cylinder head 2, the coupling base 34 coupled to the EGR cooler 27 protrudes frontward, and an EGR gas outlet of the downstream EGR gas relay fluid passage 32 is opened in a right surface of the coupling base 34. One end of the recirculation exhaust gas tube 28 of the EGR device 24 is coupled to the right surface of the coupling base 34, and thereby the collector 25 of the EGR device 24 is in communication with the downstream EGR gas relay fluid passage 32 provided inside the cylinder head 2 via the recirculation exhaust gas tube 28 and the EGR valve member 29.

On the rear side (the cooling fan 9 side) of the right surface of the cylinder head 2, the coolant drainage (thermostat case) 35 whose upper surface is opened to communicate with a coolant outlet pipe (thermostat cover) 23 protrudes rearward, and a thermostat (not shown) is installed therein. The coolant drainage 35 is offset at the rear of the right surface of the cylinder head 2, and therefore it is possible that the V-belt 10 wound on a fan pulley 9a to which the cooling fan 9 is fixed extends through a space below the coolant drainage 35. Thus, the length of the diesel engine 1 in the front-rear direction can be shortened. The coolant drainage 35 also protrudes from the right surface of the cylinder head 2. On the right surface of the cylinder head 2, the intake manifold 3 and the coolant drainage 35 are arranged one behind the other with respect to the front-rear direction.

On the front side (the flywheel housing 7 side) of the left surface of the cylinder head 2, the coupling base 33 coupled to the EGR cooler 27 protrudes frontward, and an EGR gas inlet 96 of the upstream EGR gas relay fluid passage 31 is opened in a left surface of the coupling base 33. That is, in the left surface of the cylinder head 2, the EGR gas inlet 96 of the upstream EGR gas relay fluid passage 31 and exhaust gas outlets of the plurality of exhaust fluid passages 37 are arranged in the front-rear direction, and are opened. The exhaust manifold 4 has, in its right surface which is coupled to the left surface of the cylinder head 2, the EGR gas outlet 41 which is in communication with the upstream EGR gas relay fluid passage 31 and exhaust gas inlets 42 which are in communication with the plurality of exhaust fluid passages 37 are arranged in the front-rear direction, and are opened. Since the EGR inlet and the exhaust gas outlets are arranged side-by-side in the same surface of the cylinder head 2, it is easy for a coupling portion where the cylinder head 2 is coupled to the exhaust manifold 4 to obtain an airtightness (gas sealability) by sandwiching a single gasket 45 therebetween.

The exhaust manifold 4 is provided therein with an exhaust aggregate part 43 which is in communication with the EGR gas outlet 41 and the exhaust gas inlets 42. The exhaust aggregate part 43 is disposed such that its longitudinal direction is parallel to the front-rear direction. An exhaust gas outlet 44 which is in communication with the exhaust aggregate part 43 is opened in a rear portion of the left surface of the exhaust manifold 4. The exhaust manifold 4 is configured such that, after an exhaust gas coming from the exhaust fluid passages 37 of the cylinder head 2 flows into the exhaust aggregate part 43 via the exhaust gas inlets 42, part of the exhaust gas serves as an EGR gas and flows into the upstream EGR gas relay fluid passage 31 of the cylinder head 2 via the EGR gas outlet 41 while the rest of the exhaust gas flows into the two-stage turbocharger 30 via the exhaust gas outlet 44.

On the front surface of the cylinder head 2, the left and right pair of EGR cooler coupling bases 33, 34 are disposed on the exhaust manifold 4 side and on the intake manifold 3 side, respectively. The EGR cooler coupling base 33 has the upstream EGR gas relay fluid passage 31 through which the EGR gas fluid passage of the exhaust manifold 4 communicates with the EGR gas fluid passage of the EGR cooler 27. The EGR cooler coupling base 34 has the downstream EGR gas relay fluid passage 32 through which the EGR gas fluid passage of the EGR device 24 communicates with the EGR gas fluid passage of the EGR cooler 27. The EGR cooler coupling base 33 also has the downstream coolant passage 38 to which a coolant is discharged from the EGR cooler 27. The EGR cooler coupling base 34 has the upstream coolant passage 39 that supplies a coolant to the EGR device 24 and to the EGR cooler 27.

Since the EGR cooler coupling bases 33, 34 are configured in a protruding manner, there is no need for EGR gas piping that communicates the exhaust manifold 4, the EGR cooler 27, and the EGR device 24. Thus, the number of coupling portions of the EGR gas fluid passage is small. Accordingly, in the diesel engine 1 that aims to reduce NOx by the EGR gas, EGR gas leakage can be reduced, and moreover deformation can be suppressed which may otherwise be caused by a change in a stress due to extension and contraction of piping. Since the EGR gas relay fluid passages 31, 32 and the coolant passages 38, 39 are provided in the EGR cooler coupling bases 33, 34, the shapes of the fluid passages 31, 32, 38, 39 formed in the cylinder head 2 are simplified, so that the cylinder head 2 can be easily formed by casting without using a complicated core.

The EGR cooler coupling base 33 on the intake manifold 3 side and the EGR cooler coupling base 34 on the exhaust manifold 4 side are distant from each other. This can suppress a mutual influence between thermal deformations of the coupling bases 33, 34. Accordingly, gas leakage and damage of coupling portions where the EGR cooler coupling bases 33, 34 are coupled to the EGR cooler 27 can be prevented, and in addition, a balance of the rigidity of the cylinder head 2 can be maintained. Moreover, the volume of the front surface of the cylinder head 2 can be reduced, which leads to weight reduction of the cylinder head 2. Furthermore, it is possible that the EGR cooler 27 is disposed at a distance from the front surface of the cylinder head 2, to provide a space on the front and rear siddes of the EGR cooler 27. This enables cool air to flow around the EGR cooler 27, thus increasing the cooling efficiency of the EGR cooler 27.

In the EGR cooler coupling base 33, the downstream coolant passage 38 is disposed above the upstream EGR gas relay fluid passage 31. In the EGR cooler coupling base 34, the downstream EGR gas relay fluid passage 32 is disposed above the upstream coolant passage 39. A coolant inlet of the downstream coolant passage 38 and an EGR gas inlet of the downstream EGR gas relay fluid passage 32 are disposed at the same height. A coolant outlet of the upstream coolant passage 39 and an EGR gas outlet of the downstream EGR gas relay fluid passage 32 are disposed at the same height.

Since the EGR gas relay fluid passages 31, 32 and the coolant passages 38, 39 are provided in the EGR cooler coupling bases 33, 34 protruding at a distance from each other, a mutual influence between thermal deformations of the EGR cooler coupling bases 33, 34 is relieved. In the EGR cooler coupling bases 33, 34, the EGR gas flowing in the EGR gas relay fluid passages 31, 32 is cooled by the coolant flowing in the coolant passages 38, 39, so that thermal deformations of the EGR cooler coupling bases 33, 34 are suppressed. In addition, the up-down positional relationship of the EGR gas relay fluid passages 31, 32 and the coolant passages 38, 39 in one of the EGR cooler coupling bases 33, 34 is reverse to that in the other of the EGR cooler coupling bases 33, 34. As a result, heat distributions in the respective EGR cooler coupling bases 33, 34 are in opposite directions with respect to the up-down direction, which can reduce an influence of thermal deformation in the height direction in the cylinder head 2.

An outer peripheral wall of the cylinder head 2 stands upward at a peripheral edge of the upper surface of the cylidner head 2, to provide a spacer 46 which is coupled to a peripheral edge of a lower surface of the head cover 18. The spacer 46 has, in a right surface thereof, a plurality of openings 47. Fuel pipes 48 which couple injectors (not shown) provided in the cylinder head 2 to the common rail 16 pass through the openings 47. Since the spacer 46 integrated with the cylinder head 2 is disposed above the cylinder head 2, the rigidity of the cylinder head 2 is increased, which can reduce distortion of the cylinder head 2 itself and also can allow component parts coupled to the cylinder head 2 to be supported with a high rigidity.

A configuration of the EGR device 24 will now be described with reference to FIG. 9 to FIG. 11, FIG. 14, FIG. 15, and FIG. 17 to FIG. 19. As shown in FIG. 9 to FIG. 11, FIG. 14, FIG. 15, and FIG. 17 to FIG. 19, the EGR device 24 includes the collector (main body case) 25 that mixes fresh air with an EGR gas, and supplies a mixture to the intake manifold 3. The intake manifold 3 and the intake throttle member 26 for taking fresh air in are connected in communication with each other via the collector 25. The EGR valve member 29 which leads to an outlet side of the recirculation exhaust gas tube 28 is connected in communication with the collector 25.

In the collector 25, a fresh air flow direction and an EGR gas flow direction cross each other perpendicularly or with a obtuse angle, and a direction in which a mixed gas of the EGR gas and the fresh air is taken into the intake manifold 3 intersects each of the fresh air flow direction and the EGR gas flow direction. A fresh air inlet 81 to which the fresh air is supplied is opened in one of front and rear surfaces of the collector 25, whereas an EGR gas inlet 82 to which the EGR gas is supplied is opened in the other of the front and rear surfaces of the collector 25. The intake outlet 83 which is coupled to the intake manifold 3 is opened in a left surface of the collector 25. The EGR gas inlet 82 and the intake outlet 83 are disposed at the same height, and the fresh air inlet 81 and the EGR gas inlet 82 are disposed at different heights.

In the collector 25, fresh air taken from the intake throttle member 26 into the fresh air inlet 81 flows in the front-rear direction and then in the up-down direction while curving in an L-shape, whereas an EGR gas taken from the EGR valve member 29 into the EGR gas inlet 82 flows obliquely upward. As a result, the EGR gas flows in toward a flow of the fresh air, which facilitates mixing of the EGR gas with the fresh air. The mixed gas of the fresh air and the EGR gas flows in the up-down direction and then in the left-right direction while curving in an L-shape, to flow into the intake manifold 3 through the intake outlet 83. A direction in which the mixed gas is emitted intersects not only the directions in which the fresh air and the EGR gas are taken in but also the directions in which the fresh air and the EGR gas flow within the collector 25. Consequently, a distribution of mixture of the EGR gas with the fresh air can be made uniformed.

In the collector 25, as described above, the EGR gas flow direction is at an angle of 90° or more relative to the fresh air flow direction, and the fresh air flow and the EGR gas flow intersect each other, so that a distribution of mixture of the EGR gas with the fresh air can be made uniform, and an uneven flow of the EGR gas in the intake manifold 3 can be suppressed. As a result, a concentration of the intake EGR gas supplied to each of the plurality of intake fluid passages 36 of the cylinder head 2 can be made uniform. Thus, a variation in combustion action among cylinders of the diesel engine 1 can be suppressed. Consequently, generation of brack smoke is suppressed, and the amount of NOx can be reduced while a good combustion state of the diesel engine 1 is maintained. That is, purifying (cleaning) the exhaust gas by a recirculation flow of the EGR gas can be achieved without causing a misfire in a specific cylinder.

The collector 25 includes an upper case (first case) 84 with the fresh air inlet 81 and a lower case (second case) 85 with the EGR gas inlet 82 and the intake outlet 83 being coupled to each other. Since the collector 25 is divisible in the up-down direction into the upper case 84 and the lower case 85, a mixed fluid passage where the EGR gas flow and the fresh air flow intersect each other at an angle of 90° or more can be easily formed in the collector 25. It therefore is possible that the collector 25 is formed as a casting with a high rigidity, and moreover, weight reduction of the collector 25 can be obtained by forming the collector 25 as an aluminium-based casting product.

The upper case 84 is provided therein with a downstream EGR gas fluid passage (first EGR gas fluid passage) 86a which is a part of the EGR gas fluid passage 86 where the EGR gas flows and a mixing chamber 87 in which the fresh air and the EGR gas are mixed. The lower case 85 is provided therein with an upstream EGR gas fluid passage (second EGR gas fluid passage) 86b through which the downstream EGR gas fluid passage 86a is in communication with the EGR gas inlet 82 and a mixed gas fluid passage 88 through which a mixed gas obtained by mixing the fresh air with the EGR gas is supplied from the mixing chamber 87 to the intake manifold 3.

The EGR gas inlet 82 is disposed in the lower case 85 while the fresh air inlet 81 and the mixing chamber 87 are disposed in the upper case 84. In the mixing chamber 87, therefore, the fresh air flowing from the fresh air inlet 81 and the EGR gas flowing from the lower case 85 intersect each other, so that the fresh air and the EGR gas can be efficiently mixed. In addition, the intake outlet 83 is disposed in the lower case 85, and the fresh air having entered the upper case 84 tends to flow toward the lower case 85. As a result, mixing of the EGR gas flowing toward the upper case 84 with the fresh air is made uniform. Furthermore, each of the EGR gas fluid passage 86, the mixing chamber 87, and the mixed gas fluid passage 88 can be compactly configured within the collector 25, and thus the collector 25 can be downsized.

In a plan view, the downstream EGR gas fluid passage 86a is coupled with an offset to a side surface (right side surface) of the mixing chamber 87 opposite to a side surface (left side surface) thereof having the intake outlet 83 relative to a central axis of the mixing chamber 87, and the downstream EGR gas fluid passage 86a and the upstream EGR gas fluid passage 86b are in communication with each other so that the EGR gas fluid passage 86 is formed in a spiral manner. The EGR gas fluid passage 86 composed of the downstream EGR gas fluid passage 86a and the upstream EGR gas fluid passage 86b has a bent shape curved toward the side (right side) opposite to the intake outlet 83 in a plan view. A bottom of the upstream EGR gas fluid passage 86b is constituted by a slope (a slope inclined upward toward the rear) extending from the EGR gas inlet 82 toward the upper case 84.

A portion of the mixing chamber 87 that is in communication with the EGR gas fluid passage 86 is on the side opposite to the intake outlet 83. The EGR gas flowing into the mixing chamber 87, therefore, reaches the intake outlet 83 while being guided by a fresh air flow, which allows the EGR gas to be uniformly mixed with the fresh air. The EGR gas flowing from the EGR gas fluid passage 86 into the mixing chamber 87 flows in a direction against the direction from the mixing chamber 87 toward the mixed gas fluid passage 88. This causes the fresh air and the EGR gas to collide with each other while flowing within the mixing chamber 87. Accordingly, the EGR gas is smoothly mixed with the fresh air.

Since the EGR gas flows along the EGR gas fluid passage 86 having a spiral shape, the EGR gas creates a swirling flow having a clockwise vortex when flowing into the mixing chamber 87. Such a turbulent EGR gas flows in a direction against the fresh air gas flow. Thus, simultaneously with flowing into the mixing chmber 87, the EGR gas is smoothly mixed with the fresh air flowing within the mixing chamber 87. In the collector 25, therefore, the fresh air and the EGR gas can be efficiently mixed (the EGR gas can be smoothly dispersed in the mixed gas) by agitation before they are fed to the intake manifold 3, so that a variation (unevenness) in the gas mixing state within the collector 25 can be suppressed more reliably. As a result, a mixed gas having less unevenness can be distributed to the respective cylinders of the diesel engine 1, and a variation in the EGR gas amount among the cylinders can be suppressed. Accordingly, it is possible to suppress generation of brack smoke, and to reduce the amount of NOx while maintaining a good combustion state of the diesel engine 1. In addition, the EGR gas fluid passage 86 having a spiral shape gives sufficient swirling properties to the EGR gas flowing into the mixing chamber 87. Thus, the collector 25 can be shaped with a shortened length in the front-rear direction.

A lower surface flange 84a of the upper case 84 and an upper surface flange 85a of the lower case 85 are fastened with bolts, to form the collector 25 having openings (the fresh air inlet 81, the EGR gas inlet 82, and the intake outlet 83) in three directions (toward the front, rear, and left). The upper case 84 has a rear surface flange 84b in which the fresh air inlet 81 is opened, and a fresh air outlet of the intake throttle member 26 is fastened to the rear surface flange 84b with bolts. The intake throttle member 26 adjusts the degree of opening of an intake valve (butterfly valve) 26a provided therein, to thereby adjust the amount of fresh air supply to the collector 25.

The lower case 85 has a front surface flange 85b in which the EGR gas inlet 82 is opened, and an EGR gas outlet of the EGR valve member 29 is fastened with bolts to the front surface flange 85b with interposition of a relay flange 89 having a rectangular pipe shape. The EGR valve member 29 adjusts the degree of opening of an EGR valve (not shown) provided therein, to thereby adjust the amount of EGR gas supply to the collector 25. A reed valve 90 inserted in the EGR gas inlet 82 is fixed inside the front surface flange 85b of the lower case 85. The relay flange (spacer) 89 which is fastened to the front surface flange 85b with bolts covers the front side of the reed valve 90. As a result, the collector 25 is provided therein with the reed valve 90 disposed in a portion of the EGR gas fluid passage 86, the portion being on the EGR gas inlet 82 side.

The relay flange 89 has, in its rear surface coupled to the collector 25, an EGR gas outlet 89a which is in communication with the EGR gas inlet 82. The relay flange 89 has a front surface from which valve coupling bases 89b, 89c to be coupled to the EGR valve member 29 protrude. Openings of the valve coupling bases 89b, 89c are in communication with the EGR gas outlet of the EGR valve member 29. In the relay flange 89, the EGR gas is merged at EGR gas inlets of the upper and lower valve coupling bases 89b, 89c, and then is caused to flow from the EGR gas inlet 82 into the EGR gas fluid passage 86 provided inside the collector 25 via the reed valve 90.

The EGR valve member 29 is configured such that: a valve body 29e has an EGR gas fluid passage 29f in which an EGR valve (not shown) is disposed; an actuator 29d for adjusting the degree of opening of the EGR valve is disposed above the valve body 29e; the EGR valve member 29 has its longitudinal direction in parallel to the up-down direction; and the EGR valve member 29 is coupled to the front side of the collector 25 with interposition of the relay flange 89. The EGR valve member 29 has, in a rear surface of the valve body 29e which is arranged lower, outlet side flanges 29a, 29b to be coupled respectively to the valve coupling bases 89b, 89c of the relay flange 89. The outlet side flanges 29a, 29b are arranged one above the other. The EGR valve member 29 also has, in its front surface, an inlet side flange 29c having an EGR gas inlet that is in communication with the EGR gas outlet of the recirculation exhaust gas tube 28.

The EGR valve member 29 is configured such that: after an EGR gas cooled by the EGR cooler 27 flows into the EGR gas inlet of the inlet side flange 29c through the downstream EGR gas relay fluid passage 32 of the EGR cooler coupling base 34 and the recirculation exhaust gas tube 28, the EGR gas is disbributed to upper and lower parts via the EGR gas fluid passage 29f of the valve body 29e. The EGR gas flow distributed to upper and lower parts through the EGR gas fluid passage 29f is then subjected to a flow rate adjustment by the EGR valve, and then enters the relay flange 89 through the EGR gas outlets of the upper and lower outlet side flanges 29a, 29b.

The recirculation exhaust gas tube 28 includes a gas pipe portion 28a and a rib 28b, the gas pipe portion 28a being bent to have an L-shape in a plan view, the rib 28b having a flat-plate shape protruding from an inner peripheral side of an outer wall of the gas pipe portion 28a. The recirculation exhaust gas tube 28 has, at one end (rear end) of the gas pipe portion 28a, an outlet side flange 28c to be coupled to the inlet side flange 29c of the EGR valve member 29, and also has, at the other end (left end) of the gas pipe portion 28a, an inlet side flange 28d to be coupled to the right surface of the EGR cooler coupling base 34. The recirculation exhaust gas tube 28 further has, in an upper surface of a bent portion of the gas pipe portion 28a, a sensor attachment base 28e to which an EGR gas temperature sensor is attached.

In the EGR device 24, the collector 25 can be configured with a shortened length, and therefore the distance between the EGR valve member 29 and the intake throttle member 26 can be shortened, which enables the length of the EGR device 24 in the front-rear direction to be shortened. In the EGR valve member 29, the actuator 29d is disposed on the upper side. It therefore is possible that topmost portions of the EGR valve member 29, the collector 25, and the intake throttle member 26 are at the same height. This can lower the height of the EGR device 24 in the up-down direction, and also can narrow the width of the EGR device 24 in the left-right direction. Since the EGR device 24 can be configured compactly, coupling the EGR device 24 to the right side of the cylinder head 2 integrated with the intake manifold 3 can be easily implemented merely by adjusting the recirculation exhaust gas tube 28. In addition, such a configuraiton contributes to downsizing of the diesel engine 1.

The recirculation exhaust gas tube 28 has the flat-plate rib 28b that is coupled so as to connect the opposite ends of the gas pipe portion 28a. This gives a high rigidity to the recirculation exhaust gas tube 28, and also increases a strength with which the front end side of the EGR device 24 is supported on the cylinder head 2. In addition, the recirculation exhaust gas tube 28 has the flat-plate rib 28b that is disposed along an EGR gas fluid passage 28f provided inside the gas pipe portion 28a. Due to the rib 28b, the gas pipe portion 28a has a wide heat dissipation area, which increases the effect of cooling the EGR gas flowing in the EGR gas fluid passage 28f. This contributes to cooling a mixed gas prepared in the EGR device 24, and exerts an effect that reduction in the amount of NOx generated from the mixed gas can be easily kept in a proper state.

A configuration of the EGR cooler 27 will now be described with reference to FIG. 9 to FIG. 11, FIG. 13 to FIG. 16, and FIG. 20 to FIG. 21. As shown in FIG. 9 to FIG. 11, FIG. 13 to FIG. 16, and FIG. 20 to FIG. 21, the EGR cooler 27 includes a heat exchanger 91 and a pair of left and right flange portions 92, 93. The heat exchanger 91 has a coolant passage and an EGR gas fluid passage alternately stacked. The pair of left and right flange portions 92, 93 are disposed in left and right end portions of one side surface of the heat exchanger 91. The coolant outlet 94 is disposed in one of the left and right flange portions 92, 93, while the coolant inlet 95 is disposed in the other of the left and right flange portions 92, 93. The EGR gas inlet 96 is disposed in one of the left and right flange portions 92, 93, while the EGR gas outlet 97 is disposed in the other of the left and right flange portions 92, 93. The left and right flange portions 92, 93 are coupled to the front surface of the cylinder head 2, so that the EGR cooler 27 is fixed to the cylinder head 2.

Since each of the pair of left and right flange portions 92, 93 has a coolant opening and an EGR gas opening, it is possible that the flange portions 92, 93 are made from a common member, and moreover material costs of the flange portions 92, 93 can be suppressed. The flange portions 92, 93 are formed by a flat plate being bored to have through holes 100 to 103 corresponding to the coolant and the EGR gas, the flat plate being coupled to the cylinder head 2. Thus, forming the flange portions 92, 93 in the EGR cooler 27 is easy. In addition, a coupling portion where the flange portions 92, 93 are coupled to the heat exchanger 91 can be minimized, so that the amount of heat transfer from the cylinder head 2 to the heat exchanger 91 can be reduced, which increases the effect of cooling the EGR gas by the heat exchanger 91.

Since the EGR cooler 27 has the flange portions 92, 93 protruding from the rear surface of the heat exchanger 91, a space is formed between the heat exchanger 91 and the cylinder head 2. As a result, the EGR cooler 27 is in a state where a wide area of the front and rear surfaces of the heat exchanger 91 is exposed to outdoor air. Heat dissipation occurs in the heat exchanger 91, too. Thus, the effect of cooling the EGR gas by the EGR cooler 27 is increased. This configuration can reduce the degree of stacking in the heat exchanger 91 as compared to a configuration in which the rear surface and the front surface of the heat exchanger 91 are attached. The length of the EGR cooler 27 in the front-direction can be shorted, and thus the diesel engine 1 can be downsized.

The left flange portion 92 has the coolant outlet 94 and the EGR gas inlet 96, while the right flange portion 93 has the coolant inlet 95 and the EGR gas outlet 97. In the left flange portion 92, the coolant outlet 94 is disposed above the EGR gas inlet 96, while in the right flange portion 93, the EGR gas outlet 97 is disposed above the coolant inlet 95. The coolant outlet 94 and the EGR gas outlet 97 are disposed at the same height, while the coolant inlet 95 and the EGR gas inlet 96 are disposed at the same height.

The left and right flange portions 92, 93 of the EGR cooler 27 are coupled respectively to the EGR cooler coupling bases 33, 34 protruding from the front surface of the cylinder head 2. The upstream EGR gas relay fluid passage 31 and the downstream coolant passage 38 of the left EGR cooler coupling base 33 are in communication with the EGR gas inlet 96 and the coolant outlet 94 of the left flange portion 92, respectively. The downstream EGR gas relay fluid passage 32 and the upstream coolant passage 39 of the right EGR cooler coupling base 34 are in communication with the EGR gas outlet 97 and the coolant inlet 95 of the right flange portion 93, respectively.

The EGR gas relay fluid passages 31, 32 and the coolant passages 38, 39 are provided in the coupling bases 33, 34 to which the flange portions 92, 93 of the EGR cooler 27 are coupled, and are in communication with the EGR gas inlet and outlet 96, 97 and the coolant outlet and inlet 94, 95 of the flange portions 92, 93. It is not necessary that coolant piping and EGR gas piping are disposed between the EGR cooler 27 and the cylinder head 2. Accordingly, a sealability can be given to a coupling portion where the EGR cooler 27 and the cylinder head 2 are coupled to each other without any influence of, for example, extension and contraction of piping caused by the EGR gas or the coolant. In addition, the EGR cooler 27 is given an enhanced resistance against external fluctuation factors such as heat and vibration, and can be compactly installed in the cylinder head 2.

The coolant outlet 94 is disposed above the EGR gas inlet 96 in the flange portion 92, while the EGR gas outlet 97 is disposed above the coolant inlet 95 in the flange portion 93. Thus, the flange portions 92, 93 having identical shapes with their postures mutually upside-down are attached to the heat exchanger 91. This can reduce the number of types of component parts included in the EGR cooler 27, thus improving an assemblability of the EGR cooler 27 and reducing costs of the component parts.

The flange portion 92 is provided with the coolant outlet 94 and the EGR gas inlet 96 through which a coolant or an EGR gas having a large quantity of heat passes, while the flange portion 93 is provided with the coolant inlet 95 and the EGR gas outlet 97 through which a coolant or an EGR gas having a small quantity of heat passes. Accordingly, distortion caused by thermal deformation of each of the flange portions 92, 93 can be suppressed. In addition, the flange portions 92, 93 are configured as separate members whose thermal deformation is less influential to each other, and therefore damage and breakdown of the EGR cooler 27 can be prevented.

In the EGR cooler 27, the coolant outlet 94 and the coolant inlet 95 are disposed at diagonal positions, and the EGR gas inlet 96 and the EGR gas outlet 97 are disposed at diagonal positions in a rear view. Since EGR gases having different quantities of heat and coolants having different quantities of heat are respectively supplied or discharged at diagonal positions, thermal deformations of coupling portions where the EGR cooler 27 is coupled to the cylinder head 2 can be mutually relieved, so that deflection or slackness of the coupling portions can be suppressed. Accordingly, leakage of an EGR gas or a coolant in the EGR cooler 27 and in the cylinder head 2 can be prevented, and moreover a decrease in the coupling strength can be prevented.

A plate-shaped gasket 98 is sandwiched between the cylinder head 2 and the flange portions 92, 93 so as to extend across the left and right flange portions 92, 93. A coolant inlet and a coolant outlet of the cylinder head 2, which are respectively in communication with the coolant outlet 94 and the coolant inlet 95 of the flange portions 92, 93, have O-rings 99 embedded therein, the O-rings 99 being ring-shaped seal members. The O-rings 99 are covered with the flange portions 92, 93.

Since the flange portions 92, 93 configured as separate members are coupled to the coupling bases 33, 34 of the cylinder head 2 with the gasket 98 interposed therebetween, a tension is exerted on the gasket 98 due to thermal deformation of the coupling portion coupled to the cylinder head 2. This enhances a sealability (hermetic sealing performance) of the gasket 98 in a coupling portion of each of the EGR gas inlet 96 and the EGR gas outlet 97. Thus, leakage of an EGR gas flowing from one to the other between the cylinder head 2 and the EGR cooler 27 can be prevented. The O-rings 99 are embedded in spaces defined by rear end surfaces of the flange portions 92, 93 and the coolant inlet and the coolant outlet of the coupling bases 33, 34 of the cylinder head 2. When a coolant flows, therefore, the coolant is in contact with the O-rings 99 in communication portions where the coupling bases 33, 34 are in communication with the flange portions 92, 93. Thus, a sealability (hermetic sealing performance) of the coupling portions of the coolant outlet and inlet 94, 95 can be obtained. Accordingly, even though the EGR cooler 27 where a liquid and a gas enter and exit is coupled to the cylinder head 2, a sealability for each of the liquid and the gas can be obtained, so that leakage of each of the EGR gas and the coolant can be prevented.

An outer peripheral portion of each of the flange portions 92, 93 is bored to have through holes 100 for bolt fastening, at outer positions. Specifically, the left flange portion 92 has five through holes 100 disposed in its upper, lower, and left sides, and the right flange portion 93 has five through holes 100 disposed in its upper, lower, and right sides. Since the left flange portion 92 has the through holes 100 disposed above the coolant outlet 94, below the EGR gas inlet 96, and to the left of a portion between the coolant outlet 94 and the EGR gas inlet 96, a sealability of the coolant outlet 94 and the EGR gas inlet 96 can be exerted when the left flange portion 92 is fastened to the coupling base 33 of the cylinder head 2 with bolts. Likewise, since the right flange portion 93 has the through holes 100 disposed below the coolant inlet 95, above the EGR gas outlet 97, and to the right of a portion between the coolant inlet 95 and the EGR gas outlet 97, a sealability of the coolant inlet 95 and the EGR gas outlet 97 can be exerted when the right flange portion 93 is fastened to the coupling base 34 of the cylinder head 2 with bolts.

The gasket 98 is constituted by a lamination of two plates 98a, 98b each having through holes 101 to 103. The EGR gas passes through the through holes (EGR gas through holes) 101. The coolant passes through the through holes (coolant through holes) 102. Fastening bolts are inserted into the through holes (bolt through holes) 103. The gasket 98 has such a shape that an inner peripheral edge at the EGR gas through hole 101 is branched so as to be warped in the front-rear direction and is configured such that the open areas of the coolant through holes 102 are larger than the open areas of the coolant outlet and inlet 94, 95.

In the gasket 98, the front plate 98a has its inner peripheral edge at the EGR gas through hole 101 being warped frontward, while the rear plate 98b has its inner peripheral edge at the EGR gas through hole 101 being warped rearward. The front plate 98a and the rear plate 98b are bonded by welding, so that the inner peripheral edge at the EGR gas through hole 101 has a Y-shaped cross-section. Since the inner peripheral edge at the EGR gas through hole 101 is warped in the front-rear direction, front and rear surfaces of the inner peripheral edge at the EGR gas through hole 101 can be in tight contact with end surfaces of the coupling bases 33, 34 and the flange portions 92, 93. Accordingly, a sufficient airtightness can be obtained.

The gasket 98 is configured such that the openings of the coolant through holes 102 is larger than those of the coolant outlet and inlet 94, 95. Thus, the O-rings 99 are inserted in the coolant through holes 102. Communication portions where the coolant outlet and inlet 94, 95 of the flange portions 92, 93 are in communication with the coolant relay fluid passages 38, 39 of the coupling bases 33, 34 are hermetically sealed by the O-rings 99 fitted in the coolant through holes 102 of the gasket 98.

The coupling bases 33, 34 of the cylinder head 2 have the coolant outlet and inlet 94, 95 opened with steps, and thereby the openings of the coolant outlet and inlet 94, 95 are given larger diameters than the fluid passage diameters of the coolant relay fluid passages 38, 39 formed inside the coupling bases 33, 34. The O-rings 99 disposed to the coolant outlet and inlet 94, 95 of the coupling bases 33, 34 are fitted on the outer circumferential sides of the coolant relay fluid passages 38, 39. The O-rings 99 are inserted in the gasket 98, and also fitted in the step portions of the coolant outlet and inlet 94, 95 in the coupling bases 33, 34. Thereby, the O-rings 99 are sandwiched between the coupling bases 33, 34 and the flange portions 92, 93. When a coolant passes inside the O-rings 99 made of an elastic material, the O-rings 99 are deformed to expand outward and come into tight contact with the coupling bases 33, 34 and the flange portions 92, 93, thus providing a sealability for the coolant.

The ring-shaped O-ring 99 has its inner circumferential portion bulging frontward and rearward. A coolant passing through the inner circumferential portion of the O-ring 99 pushes the inner circumferential portion, so that its front and rear edges are deformed to protrude frontward and rearward. This brings the inner circumferential portion of the O-ring 99 into tight contact with the coupling bases 33, 34 and the flange portions 92, 93. Thus, a sealability for the coolant can be enhanced in the coupling portion where the cylinder head 2 is coupled to the EGR cooler 27.

The ring-shaped O-ring 99 whose inner circumferential portion is bulged frontward and rearward is shaped such that its inner circumferential surface has a recessed portion. The inner circumferential surface of the O-ring 99 is warped frontward and rearward so as to have a Y-shaped cross-section. A coolant passing through the inner circumferential portion of the O-ring 99 pushes the inner circumferential portion, so that its front and rear edges are further protruded frontward and rearward, to increase the degree of tight contact of the inner circumferential portion of the O-ring 99 with the coupling bases 33, 34 and the flange portions 92, 93. Accordingly, a sealability for the coolant can be enhanced in the coupling portion where the cylinder head 2 is coupled to the EGR cooler 27.

A configuration of the two-stage turbocharger 30 will now be described with reference to FIG. 22 to FIG. 27, etc. As shown in FIG. 22 to FIG. 27, the two-stage turbocharger 30 uses fluid energy of an exhaust gas discharged from the exhaust manifold 4, to compress fresh air which then flows into the intake manifold 3 of the cylinder head 2. The two-stage turbocharger 30 includes the high-pressure turbocharger 51 coupled to the exhaust manifold 4, and the low-pressure turbocharger 52 coupled to the high-pressure turbocharger 51.

The high-pressure turbocharger 51 is disposed on the left lateral side of the exhaust manifold 4, while the low-pressure turbocharger 52 is disposed above the exhaust manifold 4. The high-pressure turbocharger 51 with a low capacity is disposed opposed to the exhaust manifold 4, while the low-pressure turbocharger 52 with a high capacity is disposed above the exhaust manifold 4 which is installled to the cylinder head 2 so as to protrude laterally leftward. This enables the exhaust manifold 4 and the two-stage turbocharger 30 to be compactly arranged in a space existing on the left lateral side of the cylinder head 2, and also enables a topmost portion of the two-stage turbocharger 30 to be positioned lower than a topmost portion of the diesel engine 1. This can contribute to downsizing of the diesel engine 1. In addition, the low-pressure turbocharger 52 can be disposed close to the cylinder head 2, and thus the two-stage turbocharger 30 can be fixed with a high rigidity.

The high-pressure turbocharger 51 includes the high-pressure turbine 53 that is in communication with the exhaust gas outlet 44 of the exhaust manifold 4, and the high-pressure compressor 54 that supplies compressed air to the intake manifold 3. The high-pressure compressor 54 is in communication with the fresh air inlet 81 (see FIG. 17, etc.) of the intake throttle member 26 via an intercooler (not shown), and thereby supplies compressed air to the intake manifold 3 via the EGR device 24. The low-pressure turbocharger 52 includes the low-pressure turbine 55 whose exhaust gas inlet is in communication with an exhaust gas outlet of the high-pressure turbine 53 via an exhaust relay pipe, and the low-pressure compressor 56 whose fresh air outlet is in communication with a fresh air inlet of the high-pressure compressor 54 via a fresh air relay pipe. The low-pressure compressor 56 is disposed above the high-pressure turbine 53, the high-pressure compressor 54 is disposed on one of the front and rear sides relative to the high-pressure turbine 53, and the low-pressure turbine 55 is disposed on the other of the front and rear sides relative to the low-pressure compressor 56.

The exhaust gas outlet 44 of the exhaust manifold 4, which discharges an exhaust gas, is opened toward one of the left and right lateral sides. The exhaust gas inlet 57 of the high-pressure turbine 53 is opened toward the exhaust manifold 4, and the exhaust gas outlet 58 of the high-pressure turbine 53 is opened frontward. The exhaust gas inlet 60 of the low-pressure turbine 55 is opened downward, and the exhaust gas outlet 61 of the low-pressure turbine 55 is opened frontward.

The exhaust gas outlet 44 of the exhaust manifold 4 and the exhaust gas inlet 57 of the high-pressure turbine 53, which are opposed to each other, are flange-coupled with bolts, and thus the high-pressure turbocharger 51 is fixed on the left lateral side of the exhaust manifold 4. The exhaust gas outlet 58 of the high-pressure turbine 53 is flange-coupled to one end (rear end) of the L-shaped high-pressure exhaust gas tube 59 (exhaust relay pipe) with bolts. The exhaust gas inlet 60 of the low-pressure turbine 55 is flange-coupled to the other end (upper end) of the high-pressure exhaust gas tube 59 with bolts. The low-pressure turbocharger 52 is fixed on the upper side of the high-pressure turbocharger 51.

The high-pressure turbine 53 is flange-coupled to the exhaust manifold 4 so that the high-pressure turbocharger 51 is supported with a high rigidity, and in this condition, the low-pressure turbine 55 is flange-coupled to an upper surface of the high-pressure exhaust gas tube 59 that is flange-coupled to the front side of the high-pressure turbocharger 51. Thereby, the low-pressure turbocharger 52 can be supported from below by the high-pressure turbocharger 51. Since the low-pressure turbocharger 52 is installed close to a position above the exhaust manifold 4, the center of gravity of the low-pressure turbocharger 52 is in the vicinity of a position above the position where the exhaust manifold 4 is coupled to the high-pressure turbocharger 51. Accordingly, the two-stage turbocharger 30 can be compactly supported with a high rigidity in the vicinity of the diesel engine 1.

The high-pressure compressor 54 has a fresh air inlet port 63 (fresh air inlet) opened rearward, and has a fresh air supply port 64 (fresh air outlet) opened downward. The low-pressure compressor 56 has a fresh air inlet port 66 (fresh air inlet) opened rearward, and has a fresh air supply port 67 (fresh air outlet) protruding from the left lateral side and then directed downward. The U-shaped low-pressure fresh air passage pipe 65 (fresh air relay pipe) has one end thereof fixed to the fresh air inlet port 63 (fresh air inlet) of the high-pressure compressor 54, and has the other end thereof coupled to the fresh air supply port 67 (fresh air outlet) of the low-pressure compressor 56.

The high-pressure compressor 54 and the low-pressure compressor 56 are coupled by the U-shaped low-pressure fresh air passage pipe 65 disposed at the rear, and a front portion of the low-pressure turbocharger 52 can be fixed to the high-pressure turbocharger 51 which is supported with a high rigidity by the exhaust manifold 4. The fresh air inlet port 66 and the fresh air supply port 67 of the low-pressure compressor 56 are extended in the same direction (rearward), and can be easily coupled to the air supply pipe 62 which is in communication with an air cleaner (not shown) and to the low-pressure fresh air passage pipe 65, respectively. This configuration can enhance a workability in assembling.

The low-pressure fresh air passage pipe 65 includes a metal pipe 65*a* and a resin pipe 65*b*. The metal pipe 65*a* has its one end flange-coupled and bolt-fastened to the fresh air inlet port 66 of the high-pressure compressor 54. The resin pipe 65*b* allows the other end of the metal pipe 65*a* to communicate with the fresh air supply port 67 of the low-pressure compressor 56. Thereby, in the low-pressure fresh air passage pipe 65, the metal pipe 65a is fixed to the high-pressure compressor 54 with a high rigidity, and the resin pipe 65b allows the low-pressure compressor 56 and the metal pipe 65a to communicate with each other while lessening an assembling error therebetween.

The fresh air supply port 67 of the low-pressure compressor 56 protrudes laterally leftward from a left surface of the low-pressure compressor 56, and then is directed upward toward the rear. This configuration enables the low-pressure fresh air passage pipe 65 (metal pipe 65a) to be bent with a large curvature. As a result, generation of a turbulent flow in the low-pressure fresh air passage pipe 65 can be suppressed, so that the compressed air discharged from the low-pressure compressor 56 can be smoothly supplied to the high-pressure compressor 54.

The blow-by gas recirculation device 19 for taking a blow-by gas in is installed above the cylinder head 2. The blow-by gas recirculation device 19 is placed on and fixed to the upper surface of the head cover 18 that covers the upper surface of the cylinder head 2. A blow-by gas outlet 70 disposed at the rear of the blow-by gas recirculation device 19 is coupled to the air supply pipe 62 through the recirculation hose 68, the air supply pipe 62 being coupled to the fresh air inlet port 66 (fresh air inlet) of the low-pressure compressor 56. The air supply pipe 62 is disposed between the low-pressure fresh air passage pipe 65 (fresh air relay pipe) and the cylinder head 2.

The air supply pipe 62 is coupled to the rear side of the low-pressure turbocharger 52 which is an upper component of the two-stage turbocharger 30, and is disposed close to the cylinder head 2. Thus, the distance between the air supply pipe 62 and the blow-by gas recirculation device 19 disposed above the cylinder head 2 can be shortened. This makes it possible to shorten the recirculation hose 68 to prevent the inside of the recirculation hose 68 from being freezed under low-temperature environments. Since the air supply pipe 62 is disposed in a space surrounded by the low-pressure fresh air passage pipe 65 and the cylinder head 2, the air supply pipe 62 can be prevented from being damaged by an external force which may be applied in a coupling portion coupled to a resin pipe which is connected to the air cleaner (not shown).

The fresh air supply port 64 of the high-pressure turbocharger 51, which is opened downward, protrudes from a portion of a lower surface of the high-pressure compressor 54, the portion being on the cylinder head 2 side. The high-pressure compressor 54 is coupled to the high-pressure fresh air passage pipe 71 which is in communication with the intercooler (not shown). The high-pressure compressor 54 supplies compressed air to the intercooler through the high-pressure fresh air passage pipe 71. The coolant inlet pipe 22 which is opened laterally leftward is provided below the high-pressure compressor 54. The high-pressure fresh air passage pipe 71 as well as coolant piping which is in communication with the radiator (not shown) is arranged so as to extend to a rear portion of the left surface of the cylinder block 6, and thereby the high-pressure fresh air passage pipe 71 can be coupled to the coolant inlet pipe 22 and to the fresh air supply port 64 of the high-pressure compressor 54. As a result, pipe routing for the coolant piping and the high-pressure fresh air passage pipe 71 can be collected, which can simplify a piping structure in a main machine equipped with the diesel engine 1 and also can make an assembling work and a maintenance work easy.

In the diesel engine 1, the coolant outlet pipe 23, the air supply pipe 62, and the intake throttle member 26 are disposed above the cylinder head 2 and on the cooling fan 9 side. In the main machine equipped with the diesel engine 1, therefore, when the radiator (not shown), the air cleaner (not shown), and the intercooler (not shown) which use cooling air of the cooling fan 9 are disposed on the rear side of the cooling fan 9, coolant piping connected to the radiator and fresh air piping communicating with the air cleaner and the intercooler can be shortened, and moreover works for connecting such piping can be performed together. As a result, an assembling work and a maintenance work in the main machine can be performed with ease, and in addition, component parts to be coupled to the diesel engine 1 can be efficiently arranged in the main machine.

The exhaust gas outlet 58 of the high-pressure turbine 53 is provided with a turbine discharge hole 58a, a bypass hole 58b, and a wastegate valve 69. The turbine discharge hole 58a discharges an exhaust gas which rotates a turbine wheel (not shown). The bypass hole 58b allows the exhaust gas inlet 57 and the exhaust gas outlet 58 to communicate with each other. The wastegate valve 69 opens and closes the bypass hole 58b. Arranging the turbine discharge hole 58a and the bypass hole 58b side-by-side in the exhaust gas outlet 58 of the high-pressure turbine 53 enables whether to perform a compression operation by the high-pressure turbocharger 51 to be set in accordance with a rotational frequency of the diesel engine 1. Accordingly, with efficient use of exhaust energy, the two-stage turbocharger 30 can stabilize the amount of fresh air to be supplied to the combustion chamber, and can reduce the amount of brack smoke discharge while increasing an engine output.

When the bypass hole 58b of the high-pressure turbine 53 is opened, a bypass path extending from the exhaust manifold 4 to the low-pressure turbine 55 is formed. Thus, only the high-pressure exhaust gas tube 59 which allows the high-pressure turbine 53 and the low-pressure turbine 55 to communicate with ach other needs to be arranged. Piping for bypassing purpose that allows the exhaust manifold 4 and the low-pressure turbine 55 to communicate with each other needs not be arranged. This can simplify a piping structure in the two-stage turbocharger 30, and also can provide a large space around the two-stage turbocharger 30. It therefore is possible that, for example, an oil pressure pump (not shown) for a work machine and the engine starting starter 20 are disposed one above the other at a location below the front side of the two-stage turbocharger 30.

In the high-pressure turbocharger 51, a high-pressure working fluid supply pipe 73 and a high-pressure working fluid return pipe 74 are coupled to upper and lower portions of a center housing 72 which is a coupling portion where the high-pressure turbine 53 and the high-pressure compressor 54 are coupled to each other. Likewise, in the low-pressure turbocharger 52, a low-pressure working fluid supply pipe 76 and a low-pressure working fluid return pipe 77 are coupled to upper and lower portions of a center housing 75 which is a coupling portion where the low-pressure turbine 55 and the low-pressure compressor 56 are coupled to each other.

The high-pressure working fluid supply pipe 73 has its lower end connected to a coupling member 78 disposed on the left surface of the cylinder block 6, and its upper end coupled to an upper surface of the center housing 72 of the high-pressure turbocharger 51. A coupling joint 79 is disposed on the upper surface of the center housing 72 of the high-pressure turbocharger 51, the coupling joint 79 allowing the upper end of high-pressure working fluid supply pipe 73 to communicate with a lower end of the low-pressure working fluid supply pipe 76. An upper end of the low-pressure working fluid supply pipe 76 is coupled to an upper surface of the center housing 75 of the low-pressure turbocharger 52. With this configuration, a working fluid flowing in an oil passage within the cylinder block 6 is supplied to the center housing 72 of the high-pressure turbocharger 51 through the high-pressure working fluid supply pipe 73, and is supplied to the center housing 75 of the low-pressure turbocharger 52 through the high-pressure working fluid supply pipe 73 and the low-pressure working fluid supply pipe 76.

The high-pressure working fluid supply pipe 73 is laid between the high-pressure turbocharger 51 and the cylinder head 2 as well as the cylinder block 6 while detouring at the rear of the exhaust gas outlet 44 of the exhaust manifold 4. The low-pressure working fluid supply pipe 76 is laid in an L-shape extending along the upper surface of the high-pressure turbocharger 51 and the center housing 75 of the low-pressure turbocharger 52. Such a piping layout surrounding the two-stage turbocharger 30 which is a high-rigidity component with the working fluid supply pipes 73, 76 shortened enables the working fluid to be efficiently supplied to the two-stage turbocharger 30 and simultaneously prevents the working fluid supply pipes 73, 76 from being damaged by an external force.

The high-pressure working fluid return pipe 74 has one end (lower end) thereof coupled to the distal end (left-side distal end) of a coupling joint 80 disposed on the left surface of the cylinder block 6, and the other end (upper end) thereof coupled to a lower surface of the center housing 72 of the high-pressure turbocharger 51. The low-pressure working fluid return pipe 77 has one end (lower end) thereof coupled to one of branching upper ends of the coupling joint 80, and the other end (upper end) thereof coupled to a lower surface of the center housing 75 of the low-pressure turbocharger 52. With this configuration, a working fluid in the high-pressure turbocharger 51 and a working fluid in the low-pressure turbocharger 52 flow through the low-pressure working fluid return pipes 74, 77 disposed below the center housings 72, 75, to be merged at the coupling joint 80. A merged flow is returned to the oil passage within the cylinder block 6.

The high-pressure working fluid return pipe 74 is laid so as to detour at the rear of the exhaust gas outlet 44 of the exhaust manifold 4. The low-pressure working fluid return pipe 77 is laid between the high-pressure turbocharger 51 and the cylinder head 2 as well as the cylinder block 6 while detouring at the front of the exhaust gas outlet 44 of the exhaust manifold 4. Such a piping layout surrounding the two-stage turbocharger 30 which is a high-rigidity component with the working fluid return pipes 74, 77 shorted enables the working fluid to be efficiently supplied to the two-stage turbocharger 30 and simultaneously prevents the working fluid return pipes 74, 77 from being damaged by an external force.

Figure 28:
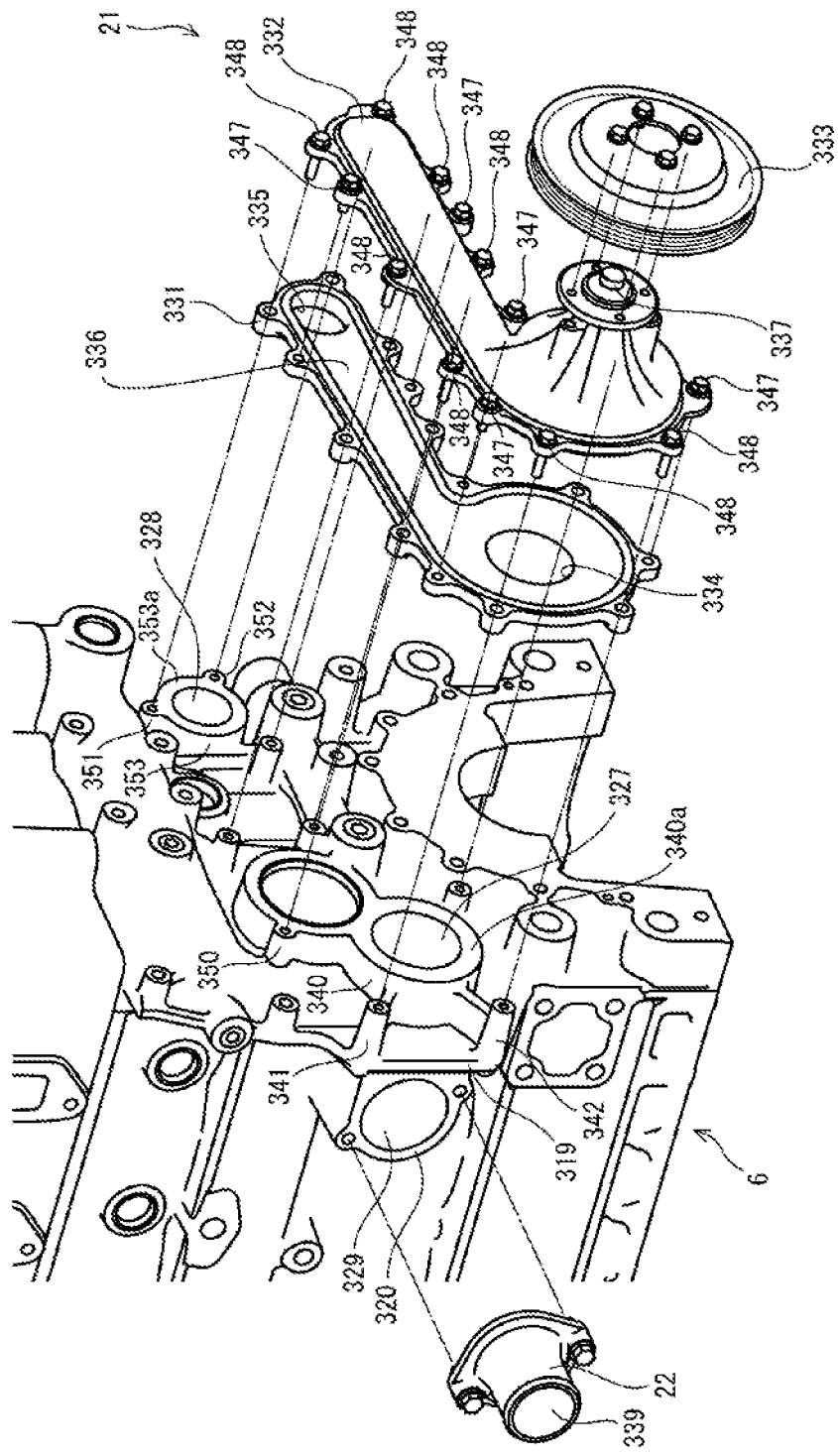
[FIG. 28] An exploded perspective view of a coolant pump.
Figure 29:
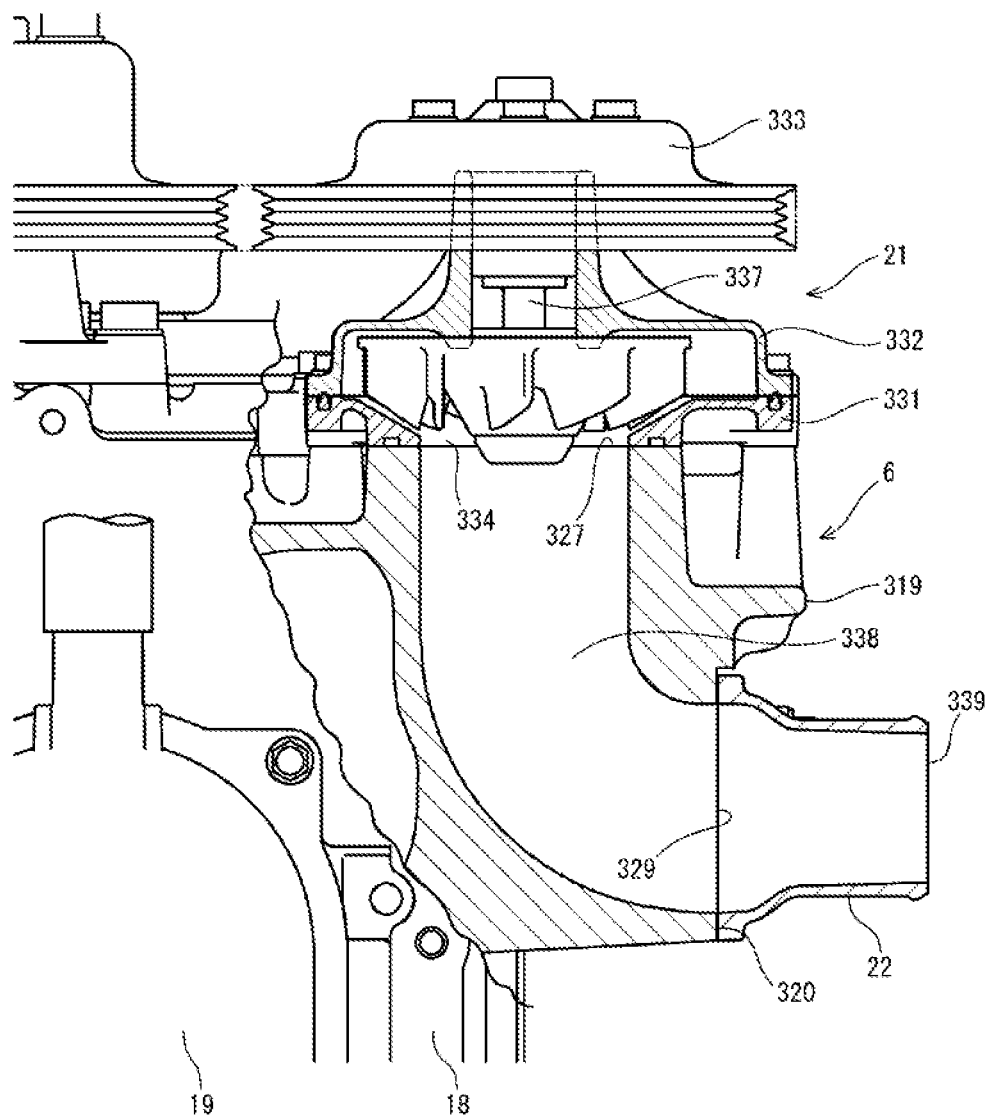
[FIG. 29] A partial cross-sectional view of a coolant pump attaching portion.

Configurations of the coolant pump 21 and the coolant inlet pipe 22 will now be described with reference to FIG. 28, FIG. 29, and the like. As shown in FIG. 28, FIG. 29, and the like, a coolant pump attaching part 319 and an inlet pipe attachment pedestal 320 are provided so as to protrude from a portion of the left surface of the cylinder block 6, the portion being relatively close to the rear surface of the cylinder block 6. To the coolant pump attaching part 319, the coolant pump 21 (see FIG. 2, etc.) is attached. To the inlet pipe attachment pedestal 320, the coolant inlet pipe 22 (see FIG. 3, etc.) is attached. The coolant pump attaching part 319 and the inlet pipe attachment pedestal 320 are formed integrally with the cylinder block 6. A portion of the inlet pipe attachment pedestal 320 close to the rear surface is coupled to the coolant pump attaching part 319. The coolant pump attaching part 319 and the inlet pipe attachment pedestal 320 protrude in a direction away from the crankshaft 5, and can enhance the rigidity, the strength, and the cooling efficiency of the cylinder block 6.

The coolant pump 21 for circulating a coolant is fastened to the rear surface 312 of the cylinder block 6 and to the coolant pump attaching part 319 with bolts. The coolant pump 21 is roughly divided into a base plate portion 331, a cover plate portion 332, and a pumping pulley 333.

The base plate portion 331 and the cover plate portion 332 have their peripheral edge portions fixed in tight contact with each other by covering bolts 347 that are inserted and fastened, from the cover plate portion 332 side, into five bolting through holes disposed in the peripheral edge portion of the base plate portion 331 and into through holes of the cover plate portion 332 corresponding to the bolting through holes.

The coolant pump 21 is bolt-fastened to the cylinder block 6 such that the plate portions 331, 332 are clamped together by mounting bolts 348 that are inserted in nine through holes disposed in each of the peripheral edge portions of the base plate portion 331 and the cover plate portion 332. Clamping with the mounting bolts 348 causes the peripheral edge portions of the base plate portion 331 and the cover plate portion 332 to be fixed in tight contact with each other, also causes a portion of the cylinder block 6 surrounding a coolant passage outlet 327 and a portion of the coolant pump 21 surrounding a pump suction port 334 to be fixed in tight contact with each other, and further causes a portion of the cylinder block 6 surrounding a coolant inlet port 328 and a portion of the coolant pump 21 surrounding a pump ejection port 335 to be fixed in tight contact with each other. As for arrangement of the bolts 347, 348 along the peripheral edge portion of the coolant pump 21, one or two mounting bolts 348 are disposed between adjacent ones of the covering bolts 347, 347.

Since the base plate portion 331 and the cover plate portion 332 are coupled to each other with the covering bolts 347, the coolant pump 21 can be distributed as a single component, and moreover an attaching work in mounting the coolant pump 21 to the cylinder block 6 with the mounting bolts 348 is easy.

The base plate portion 331, for example, includes a pump suction port 334 and a pump ejection port 335, the pump suction port 334 being connected to the coolant passage outlet 327 which includes a portion of the coolant pump attaching part 319 and which is opened in a relatively left portion of the rear surface of the cylinder block 6, the pump ejection port 335 being connected to the coolant inlet port 328 which is opened in a relatively right portion of the rear surface of the cylinder block 6.

The base plate portion 331 and the cover plate portion 332 have their peripheral edge portions in tight contact with each other, to form an in-pump coolant passage 336 that connects the pump suction port 334 to the pump ejection port 335. An annular seal member that surrounds the pump suction port 334, the pump ejection port 335, and the in-pump coolant passage 336 is disposed in a portion where the base plate portion 331 and the cover plate portion 332 are in tight contact with each other. The cover plate portion 332 pivotally supports a pump shaft 337 in a rotatable manner. An impeller is secured to one end portion of the pump shaft 337. The pumping pulley 333 is secured to the other end portion of the pump shaft 337.

A coolant passage inlet 329 is opened in the left surface of the cylinder block 6. The coolant passage inlet 329 is opened in the inlet pipe attachment pedestal 320 which protrudes from the left surface. An in-block coolant passage 338 (coolant passage) is formed inside the cylinder block 6. The in-block coolant passage 338 has a substantially L-shape that connects the coolant passage inlet 329 opened in the left surface to the coolant passage outlet 327 opened in the rear surface.

The inlet pipe attachment pedestal 320 has a pair of bolt holes on opposite sides of the coolant passage inlet 329. The coolant inlet pipe 22 (coolant inlet member) having a coolant inlet 339 is detachably fastened to the inlet pipe attachment pedestal 320 with bolts. Piping leading to the coolant outlet of the radiator is connected to the coolant inlet pipe 22. A coolant coming from the radiator is introduced into the engine 1 through the coolant inlet pipe 22, flows through the in-block coolant passage 338 and the coolant pump 21, and then taken into the cylinder block 6 from the coolant inlet port 328.

In the engine 1 of this embodiment, the coolant inlet pipe 22 having the coolant inlet 339 is detachably attached to the coolant passage inlet 329 which leads to the pump suction port 334 of the coolant pump 21. Accordingly, the position of the coolant inlet 339 can be changed just by changing the shape or the like of the coolant inlet pipe 22. This enables the position of the coolant inlet 339 of the coolant pump 21 to be easily changed without any major design change or any increase in manufacturing costs.

The coolant passage outlet 327 that supplies a coolant from the radiator to the coolant pump 21 is disposed on one of the left and right sides of the cylinder block 6, while the coolant inlet port 328 that takes a coolant from the coolant pump 21 into the cylinder block 6 is disposed on the other of the left and right sides of the cylinder block 6. The in-pump coolant passage 336 that connects the coolant passage outlet 327 to the coolant inlet port 328 is disposed across a portion close to the left surface of the cylinder block 6 and a portion close to the right surface of the cylinder block 6. With this configuration, a coolant passing through the in-pump coolant passage 336 is cooled by cooling air supplied from the cooling fan 9 (see FIG. 2) while the coolant is moving from the coolant passage outlet 327 to the coolant inlet port 328. The coolant can be cooled within the coolant pump 21 before being taken into the cylinder block 6 from the coolant inlet port 328. Accordingly, the cooling efficiency of the engine 1 can be enhanced.

The configurations of respective parts of the present invention are not limited to those of the illustrated embodiment, but can be variously changed without departing from the gist of the invention.

REFERENCE SIGNS LIST

1 engine
2 cylinder head
3 intake manifold
4 exhaust manifold
5 crankshaft
6 cylinder block
7 flywheel housing
8 flywheel
9 cooling fan
51 high-pressure turbocharger
52 low-pressure turbocharger
53 high-pressure turbine
54 high-pressure compressor
55 low-pressure turbine
56 low-pressure compressor
57 exhaust gas inlet
58 exhaust gas outlet
58*a* turbine discharge hole
58*b* bypass hole
59 high-pressure exhaust gas tube
60 exhaust gas inlet
61 exhaust gas outlet
62 air supply pipe
63 fresh air inlet port
64 fresh air supply port
65 low-pressure fresh air passage pipe
65*a* metal pipe
65*b* resin pipe
66 fresh air inlet port
67 fresh air supply port
68 recirculation hose
69 wastegate valve
70 blow-by gas outlet
71 high-pressure fresh air passage pipe
72 center housing
73 high-pressure working fluid supply pipe
74 high-pressure working fluid return pipe
75 center housing
76 low-pressure working fluid supply pipe
77 low-pressure working fluid return pipe
78 coupling member
79 coupling joint
80 coupling joint

The invention claimed is:

1. An engine device comprising:
an exhaust manifold;
an intake manifold;
a cylinder head interposed between the exhaust manifold and the intake manifold; and
a turbocharger configured to use fluid energy of an exhaust gas discharged from the exhaust manifold to compress fresh air to be flowed into the intake manifold,
wherein:
the turbocharger is constituted by a two-stage turbocharger including a high-pressure turbocharger coupled to the exhaust manifold and a low-pressure turbocharger coupled to the high-pressure turbocharger, the high-pressure turbocharger being disposed laterally from the exhaust manifold, and the low-pressure turbocharger being disposed above the exhaust manifold;
the high-pressure turbocharger includes a high-pressure turbine and a high-pressure compressor, the high-pressure turbine being in communication with an exhaust gas outlet of the exhaust manifold, and the high-pressure compressor being configured to supply compressed air to the intake manifold;
the low-pressure turbocharger includes a low-pressure turbine and a low-pressure compressor, the low-pressure turbine having a low-pressure gas inlet that is in communication with a high-pressure gas outlet of the high-pressure turbine through an exhaust relay pipe, and the low-pressure compressor having a low-pressure fresh air outlet that is in communication with a high-pressure fresh air inlet of the high-pressure compressor through a fresh air relay pipe;
the low-pressure compressor is disposed above the high-pressure turbine, the high-pressure compressor is disposed laterally from the high-pressure turbine, and the low-pressure turbine is disposed laterally from the low-pressure compressor;

the high-pressure fresh air inlet is opened laterally with respect to the high-pressure compressor, and the high-pressure compressor comprises a high-pressure fresh air outlet that is opened downward;

the low-pressure compressor comprises a low-pressure fresh air inlet that is opened laterally with respect to the low-pressure compressor, and the low-pressure fresh air outlet protrudes away from the low-pressure compressor and is opened laterally with respect to the low-pressure compressor;

a first end of the fresh air relay pipe having a U-shape is fixed to the high-pressure fresh air inlet of the high-pressure compressor, a second end of the fresh air relay pipe being coupled to the low-pressure fresh air outlet of the low-pressure compressor; and the low-pressure fresh air inlet and the low-pressure fresh air outlet of the low-pressure compressor are opened facing the same direction.

2. The engine device according to claim 1, wherein:
the fresh air relay pipe includes a metal pipe and a resin pipe, the metal pipe having one end thereof flange-coupled and bolt-fastened to the high-pressure fresh air inlet of the high-pressure compressor, the resin pipe configured to allow another end of the metal pipe to communicate with the low-pressure fresh air outlet of the low-pressure compressor.

3. The engine device according to claim 1, wherein:
the exhaust gas outlet is configured to discharge an exhaust gas,
the exhaust gas outlet opened laterally toward the high-pressure turbine,
the high-pressure turbine comprises a high-pressure gas inlet that is opened toward the exhaust manifold, and the high-pressure gas outlet is opened toward the low-pressure turbine,
the low-pressure gas inlet is opened downward and the low-pressure turbine comprises a low-pressure gas outlet that is opened laterally with respect to the low-pressure turbine,
the exhaust gas outlet of the exhaust manifold and the high-pressure gas inlet of the high-pressure turbine that are opposed to each other are coupled, to fix the high-pressure turbocharger on a side of the exhaust manifold, and
the high-pressure gas outlet of the high-pressure turbine is fixed to a first end of the exhaust relay pipe having an L-shape, the low-pressure gas inlet of the low-pressure turbine is fixed to a second end of the exhaust relay pipe, and the low-pressure turbocharger is fixed above the high-pressure turbocharger.

4. The engine device according to claim 1, wherein:
a blow-by gas recirculation device configured to take a blow-by gas in is provided on the cylinder head, and a blow-by gas outlet disposed laterally from the blow-by gas recirculation device is coupled to an air supply pipe through a recirculation hose, the air supply pipe being coupled to the low-pressure fresh air inlet of the low-pressure compressor.

5. The engine device according to claim 1, wherein:
the high-pressure gas outlet of the high-pressure turbine is provided with a turbine discharge hole, a bypass hole, and a wastegate valve, the turbine discharge hole being configured to discharge an exhaust gas for rotating a turbine wheel, the bypass hole configured to allow a high-pressure gas inlet of the high-pressure turbine and the high-pressure gas outlet to communicate with each other, and the wastegate valve being configured to open and close the bypass hole.

6. The engine device according to claim 1, wherein:
the exhaust manifold is disposed in a first direction from the cylinder head;
the intake manifold is disposed in a second direction from the cylinder head, the second direction opposite the first direction; and
the high-pressure turbocharger is disposed in one of the first direction or the second direction from the exhaust manifold.

7. The engine device according to claim 6, wherein:
the high-pressure compressor is disposed in a third direction from the high-pressure turbine;
the low-pressure turbine is disposed in a fourth direction from the low-pressure compressor, the fourth direction opposite the third direction;
the high-pressure fresh air inlet is open toward one of the third direction or the fourth direction; and
the low-pressure fresh air inlet is opened toward one of the third direction or the fourth direction.

8. The engine device according to claim 7, wherein:
the low-pressure fresh air outlet protrudes away from the low-pressure compressor in one of the first direction or the second direction and is then directed toward one of the third direction or the fourth direction.

9. The engine device according to claim 8, wherein:
the engine device defines a left side, a right side, a front side, and a rear side of the engine device;
the left side and the right side correspond to the first direction and the second direction; and
the front side and the rear side correspond to the third direction and the fourth direction.

10. The engine device according to claim 9, wherein:
the left side corresponds to the first direction; and
the front side corresponds to the fourth direction.

11. The engine device according to claim 1, wherein:
the low-pressure fresh air outlet is opened laterally with respect to the low-pressure compressor such that the low-pressure fresh air outlet and the low-pressure fresh air inlet are opened in the same direction.

12. The engine device according to claim 3, wherein:
the low-pressure fresh air outlet is opened laterally with respect to the low-pressure compressor such that the low-pressure fresh air outlet and the low-pressure gas outlet are opened in different directions.

13. The engine device according to claim 12, wherein:
the different directions are opposite directions.

14. A system comprising:
an exhaust manifold configured to output an exhaust gas;
an intake manifold configured to receive air;
a cylinder head interposed between the exhaust manifold and the intake manifold; a high-pressure turbocharger coupled to and disposed laterally from the exhaust manifold, wherein the exhaust manifold is interposed between the high-pressure turbocharger and the cylinder head, the high-pressure turbocharger includes:
a high-pressure air inlet that is opened laterally facing a first direction with respect to the high-pressure turbocharger; and
a high-pressure air outlet that is opened downward with respect to the high-pressure turbocharger; and
a low-pressure turbocharger coupled to the high-pressure turbocharger and
disposed above the exhaust manifold, the low-pressure turbocharger includes:

a low-pressure air inlet that is opened laterally facing a second direction with respect to the low-press turbocharger; and
a low-pressure air outlet that is opened laterally facing the second direction with respect to the low-pressure turbocharger, the second direction the same as the first direction; and
a fresh air relay pipe including a first end and a second end, the first end coupled to the high-pressure air inlet and the second end coupled to the low-pressure air outlet.

15. The system according to claim 14, wherein:
an air supply pipe is coupled to the low-pressure air inlet;
a blow-by gas recirculation device is coupled to the cylinder head;
the blow-by gas recirculation device is in communication with the air supply pipe via a recirculation hose; and
the blow-by gas recirculation device is configured to receive blow-by gas from the cylinder head.

16. The system according to claim 14, wherein:
the high-pressure turbocharger comprises:
    a high-pressure turbine that defines a high-pressure gas inlet and a high-pressure gas outlet, the high-pressure gas inlet is in fluid communication with an exhaust gas outlet defined by the exhaust manifold; and
    a high-pressure compressor that defines the high-pressure air inlet and the high- pressure air outlet, the high-pressure compressor is coupled to and disposed laterally with respect to the high-pressure turbine.

17. The system according to claim 16, wherein:
the high-pressure gas outlet defines:
    a turbine discharge hole configured to discharge the exhaust gas for rotating a turbine blade,
    a bypass hole positioned such that the high-pressure gas outlet and the high-pressure gas inlet communicate with each other via the bypass hole; and
    the bypass hole is coupled to a wastegate valve configured to open and close the bypass hole.

18. The system according to claim 16, wherein:
the low-pressure air inlet is opened laterally facing the second direction; and
the low-pressure turbocharger positioned above the high-pressure turbocharger, the low-pressure turbocharger comprises:
a low-pressure compressor that defines the low-pressure air inlet and the low-pressure air outlet, the low-pressure air outlet disposed above the high-pressure turbine and in fluid communication with the high-pressure air inlet via the fresh air relay pipe; and
a low-pressure turbine that defines a low-pressure gas inlet, the low-pressure turbine is positioned laterally with respect to the low-pressure compressor and is in fluid communication with the high-pressure gas outlet via an exhaust relay pipe.

19. The system according to claim 18, wherein:
the fresh air relay pipe has a U-shape and further comprises:
a metal pipe coupled to the high-pressure air inlet; and
a resin pipe coupled to the low-pressure air outlet.

20. The system according to claim 18, wherein:
the high-pressure turbine is laterally disposed with respect to the exhaust manifold;
the exhaust gas outlet faces laterally away from the cylinder head;
the high-pressure gas inlet faces toward the exhaust manifold;
the high-pressure gas outlet is open in a lateral direction away from the high-pressure compressor;
the low-pressure gas inlet is open downward with respect to the low-pressure turbine; and
the low-pressure turbine defines a low-pressure gas outlet that is open in a lateral direction.

* * * * *